(12) United States Patent
Kazuta

(10) Patent No.: US 8,177,593 B2
(45) Date of Patent: May 15, 2012

(54) OUTBOARD MOTOR

(75) Inventor: Hisashi Kazuta, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 294 days.

(21) Appl. No.: 12/752,176

(22) Filed: Apr. 1, 2010

(65) Prior Publication Data
US 2010/0261393 A1 Oct. 14, 2010

(30) Foreign Application Priority Data

Apr. 10, 2009 (JP) .................................. 2009-095887

(51) Int. Cl.
*B63B 35/73* (2006.01)
*F01N 13/00* (2010.01)

(52) U.S. Cl. ..................................................... 440/89 E

(58) Field of Classification Search ................ 440/89 A, 440/89 B, 89 C, 89 D, 89 E, 89 F, 89 G, 89 H, 440/89 J, 89 R; 123/195 P
See application file for complete search history.

(56) References Cited

U.S. PATENT DOCUMENTS 7,892,057 B1 * 2/2011 Belter ........................ 440/89 G
2005/0260900 A1 * 11/2005 Nakata et al. ............... 440/89 R

FOREIGN PATENT DOCUMENTS

JP 2008-309129 A 12/2008

* cited by examiner

*Primary Examiner* — Daniel Venne
*Assistant Examiner* — Anthony Wiest
(74) *Attorney, Agent, or Firm* — Keating & Bennett, LLP

(57) ABSTRACT

An outboard motor includes an engine, an exhaust passage, an idle exhaust passage, a contraction portion and an expansion chamber, a bypass passage, and a check valve. The bypass passage includes an upstream end connected to the idle exhaust passage at a downstream side relative to the contraction portion and the expansion chamber, and a downstream end connected to the idle exhaust passage at an upstream side relative to the contraction portion and the expansion chamber. The check valve is provided in the bypass passage. The check valve is arranged such that air flows only from the upstream end side to the downstream end side.

8 Claims, 25 Drawing Sheets

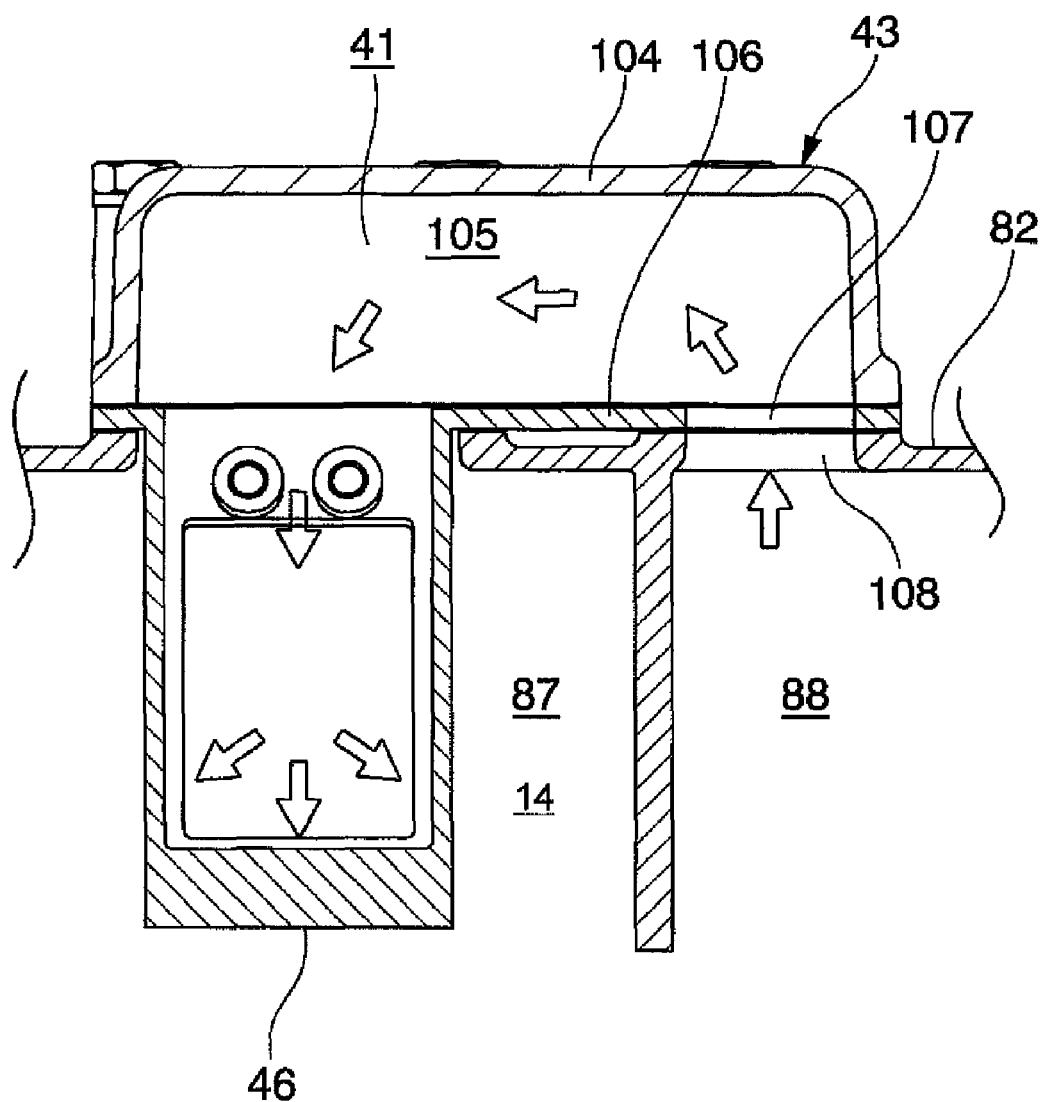

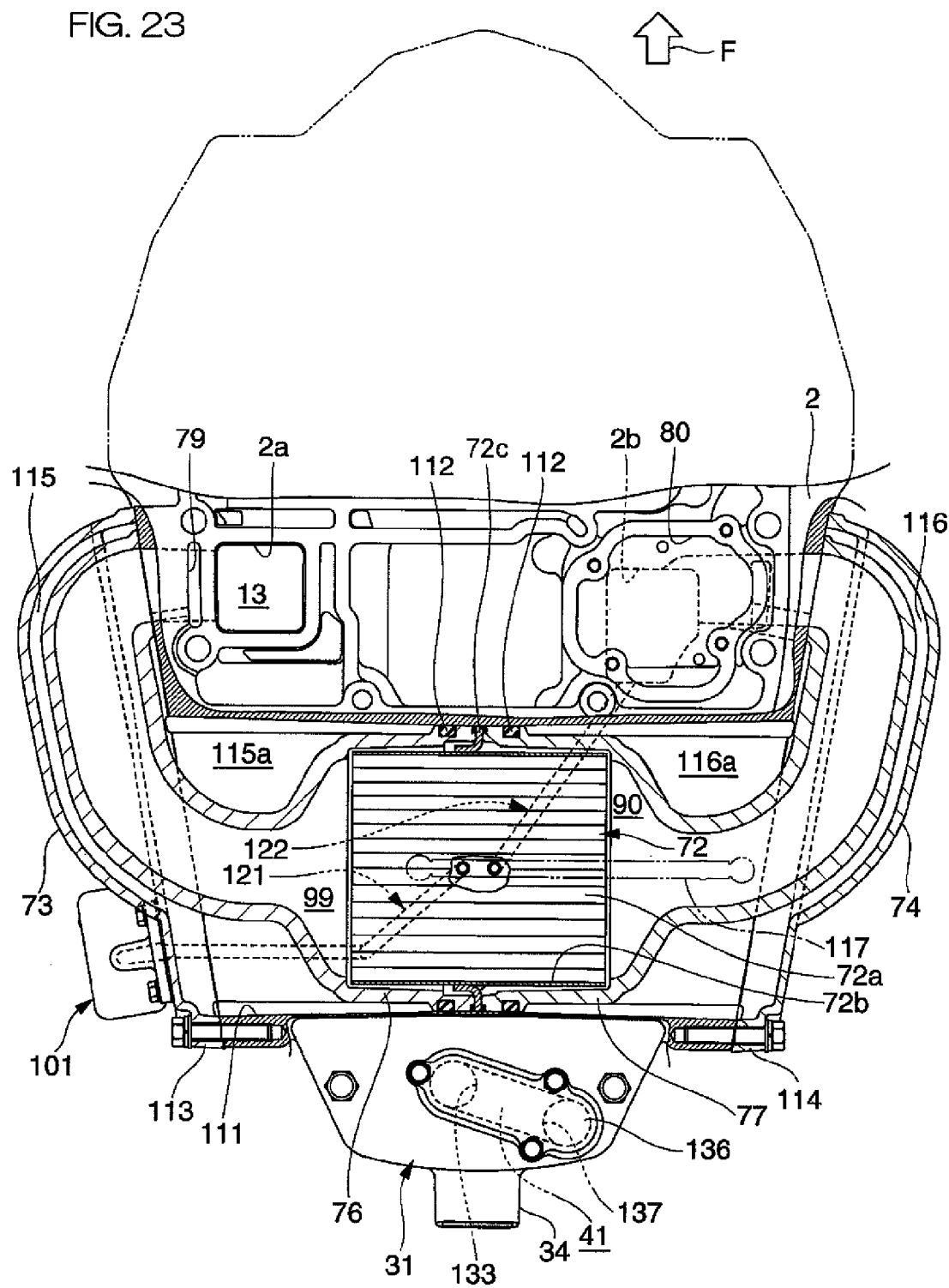

OUTBOARD MOTOR

BACKGROUND OF THE INVENTION

1. Field of the Invention

The present invention relates to an outboard motor.

2. Description of the Related Art

An outboard motor according to a prior art is disclosed in Japanese Published Unexamined Patent Application No. 2008-309129. The outboard motor includes an engine, a driveshaft, a propeller shaft, a propeller, and a forward-reverse switching mechanism. A rotation of the engine is transmitted to the propeller successively via the driveshaft, the forward-reverse switching mechanism, and the propeller shaft. The engine and the driveshaft are arranged to rotate in a fixed rotational direction. When the rotational direction of the propeller is to be switched from a forward drive direction to a reverse drive direction, the rotation transmitted from the driveshaft to the forward-reverse switching mechanism is reversed, and the reversed rotation is transmitted to the propeller shaft.

Also, the outboard motor includes an engine cover that houses the engine, and a ventilating apparatus that ventilates an interior of the engine cover. The ventilating apparatus includes a fan disposed inside the engine cover, and an air delivery passage. The fan is connected to the air delivery passage. The fan is driven by the engine. The fan is rotated at a rotational speed corresponding to the engine speed. Also, the air delivery passage is defined by a flow passage case disposed inside the engine cover. An exit of the air delivery passage opens at an outer surface of the engine cover. Air taken into the interior of the engine cover by the rotation of the fan is discharged to an exterior of the engine cover through the air delivery passage.

Also, the outboard motor includes an exhaust passage, a catalyst, an air introducing passage, and a check valve. An upstream end of the exhaust passage is connected to the engine. A downstream end of the exhaust passage is connected to the propeller. An exit of the exhaust passage opens underwater. The catalyst is disposed at the upstream end of the exhaust passage. Also, a downstream end of the air introducing passage is connected to the upstream end of the exhaust passage. An upstream end of the air introducing passage is connected to the air delivery passage. The air introducing passage is defined by a dedicated member. Also, the check valve is disposed in the air introducing passage. The check valve is arranged to open and close according to a pressure inside the air introducing passage. The check valve is arranged such that air flows only from the air delivery passage side to the exhaust passage side.

When in a state in which a hull is propelled forward by the outboard motor, the forward-reverse switching mechanism is switched from the forward drive state to the reverse drive state, the propeller may be pushed by a water stream and rotate in the forward drive direction. That is, although the engine rotates the propeller in the reverse drive direction, the propeller is rotated in the forward drive direction by the water stream. The engine is thereby reversed. Air inside the exhaust passage is thus sucked into the engine and the pressure inside the exhaust passage becomes negative (a pressure lower than the atmospheric pressure). The check valve opens when the pressure inside the exhaust passage is negative. Air inside the air delivery passage is thereby supplied into the exhaust passage via the air introducing passage. The negative pressure inside the exhaust passage is thus eliminated. Water entering into the downstream end of the exhaust passage is thus prevented from reaching the upstream end of the exhaust passage and wetting the catalyst.

SUMMARY OF THE INVENTION

The inventor of preferred embodiments of the present invention described and claimed in the present application conducted an extensive study and research regarding an outboard motor, such as the one described above, and in doing so, discovered and first recognized new unique challenges and previously unrecognized possibilities for improvements as described in greater detail below.

That is, with the outboard motor according to the prior art, the air introducing passage is defined by the dedicated member. The dedicated member arranged to define the air introducing passage is thus necessary and a cost of the outboard motor increases.

Also, with the outboard motor according to the prior art, the downstream end of the air introducing passage is connected to the upstream end of the exhaust passage. The exhaust pressure at the upstream end of the exhaust passage is comparatively high. Thus, when the check valve opens, a loud noise may be emitted from the air introducing passage. Also, this noise passes through the air delivery passage and is emitted from the exit of the air delivery passage. The exit of the air delivery passage has a large opening area. The noise transmitted to the air delivery passage from the air introducing passage is thus emitted from the exit of the air delivery passage without hardly being reduced.

Also, with the outboard motor according to the prior art, a heat of the exhaust gas discharged from the engine into the exhaust passage is transmitted to the check valve. Further, the heat of the exhaust gas is transmitted to the member (for example, the flow passage case) that defines the air delivery passage. A flow passage case made of an expensive material with heat resistance is thus necessary. The cost of the outboard motor thus increases.

Also, with the outboard motor according to the prior art, the fan is rotated at the rotational speed corresponding to the engine speed. That is, the rotational speed of the fan changes according to operation circumstances of the engine. The pressure inside the air delivery passage thus changes according to the operation circumstances of the engine. Thus, when the engine is reversed, a flow rate of the air supplied into the exhaust passage via the air introducing passage does not stabilize. Thus, the negative pressure inside the exhaust passage may not be eliminated.

In order to overcome the previously unrecognized and unsolved challenges described above, a preferred embodiment of the present invention provides an outboard motor including an engine, an exhaust passage, an idle exhaust passage, a contraction portion and an expansion chamber, a bypass passage, and a check valve. The exhaust passage includes a first upstream end connected to the exhaust port of the engine, and a first downstream end arranged to open underwater. The idle exhaust passage includes a second upstream end connected to the exhaust passage, and a second downstream end arranged to open into the atmosphere. The contraction portion and the expansion chamber are provided in the idle exhaust passage. The contraction portion and the expansion chamber are arranged to reduce exhaust noise. The bypass passage includes a third upstream end connected to the idle exhaust passage at a downstream side relative to the contraction portion and the expansion chamber, and a third downstream end connected to the idle exhaust passage at an upstream side relative to the contraction portion and the expansion chamber. The check valve is provided in the bypass passage. The check valve is arranged such that air flows only from the third upstream end side to the third downstream end side.

Other elements, features, steps, characteristics and advantages of the present invention will become more apparent from the following detailed description of the preferred embodiments with reference to the attached drawings.

BRIEF DESCRIPTION OF THE DRAWINGS

FIG. 22 is a sectional view taken along line E-E in FIG. 21A.

FIG. 23 is a plan view of an exhaust guide according to a fifth preferred embodiment of the present invention.

DETAILED DESCRIPTION OF THE PREFERRED EMBODIMENTS

First Preferred Embodiment

An outboard motor according to a first preferred embodiment of the present invention shall now be described with reference to FIG. 1 to FIG. 7C. In the figures, an arrow F indicates a front side of the outboard motor. In the description that follows, "front side," "rear side," "right side," and "left side" refer to a front side, rear side, right side, and left side, respectively, of the outboard motor.

Figure 1:
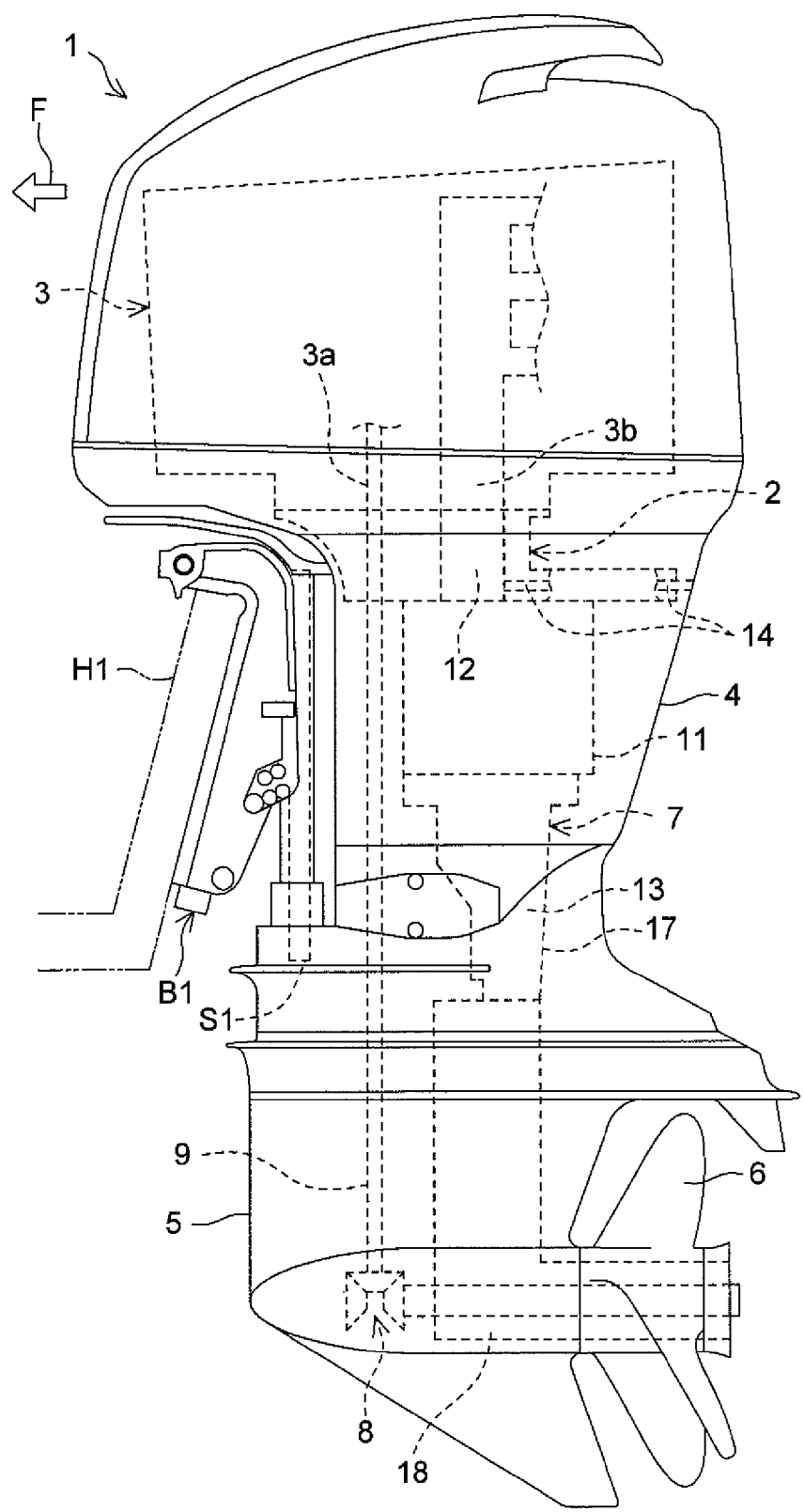
FIG. 1 is a side view of an outboard motor according to a first preferred embodiment of the present invention.

As shown in FIG. 1, the outboard motor 1 includes an engine 3, a driveshaft 9, a forward-reverse switching mechanism 8, and a propeller 6. The driveshaft 9, the forward-reverse switching mechanism 8, and the propeller 6 are disposed below the engine 3. The driveshaft 9 is disposed so as to extend vertically. An upper end portion of the driveshaft 9 is coupled to a crankshaft 3a of the engine 3. The propeller 6 is coupled to a lower end portion of the driveshaft 9 via the forward-reverse switching mechanism 8.

A rotation of the engine 3 is transmitted to the propeller 6 via the driveshaft 9 and the forward-reverse switching mechanism 8. The propeller 6 is rotated in a forward drive direction and a reverse drive direction by the engine 3. A hull H1 is propelled forward by the propeller 6 being rotated in the forward drive direction. The hull H1 is propelled in reverse by the propeller 6 being rotated in the reverse drive direction. The rotational direction of the propeller 6 is switched by the forward-reverse switching mechanism 8.

Also, as shown in FIG. 1, the outboard motor 1 includes an exhaust guide 2, an upper casing 4, and a lower casing 5. The upper casing 4 is attached to a lower portion of the exhaust guide 2. The lower casing 5 is attached to a lower portion of the upper casing 4. The engine 3 is installed on the exhaust guide 2. The driveshaft 9 extends vertically inside front portions of the upper casing 4 and the lower casing 5. The forward-reverse switching mechanism 8 is disposed inside the lower casing 5. The propeller 6 is supported rotatably by the lower casing 5. The upper casing 4 houses an oil pan 11. The oil pan 11 is coupled to a lower portion of the exhaust guide 2.

Also, as shown in FIG. 1, the exhaust guide 2 is attached to the hull H1 via a bracket B1. A front portion of the exhaust guide 2 is connected to a steering shaft S1. The exhaust guide 2 is supported by the bracket B1 via the steering shaft S1. The exhaust guide 2 can be turned to the right and left and up and down with respect to the bracket B1. By the exhaust guide 2 being turned to the right and left, the hull H1 is steered. Also, by the exhaust guide 2 being turned up and down, the outboard motor 1 is tilted with respect to the hull H1.

Also, as shown in FIG. 1, the outboard motor 1 includes an exhaust apparatus 7 that discharges an exhaust gas generated at the engine 3. The exhaust apparatus 7 includes a main exhaust passage 13. The main exhaust passage 13 is an example of an exhaust passage according to the first preferred embodiment of the present invention. The main exhaust passage 13 is arranged to extend downward from the exhaust guide 2. An upstream end (upper portion in FIG. 1) of the main exhaust passage 13 is connected to the engine 3. A downstream end (lower portion in FIG. 1) of the main exhaust passage 13 is connected to the propeller 6. An exit of the main exhaust passage 13 opens underwater. For example, when the engine 3 is idled or the hull H1 is propelled at a low speed, water around the outboard motor 1 enters into the downstream end of the main exhaust passage 13 through the exit of the main exhaust passage 13.

Figure 2:
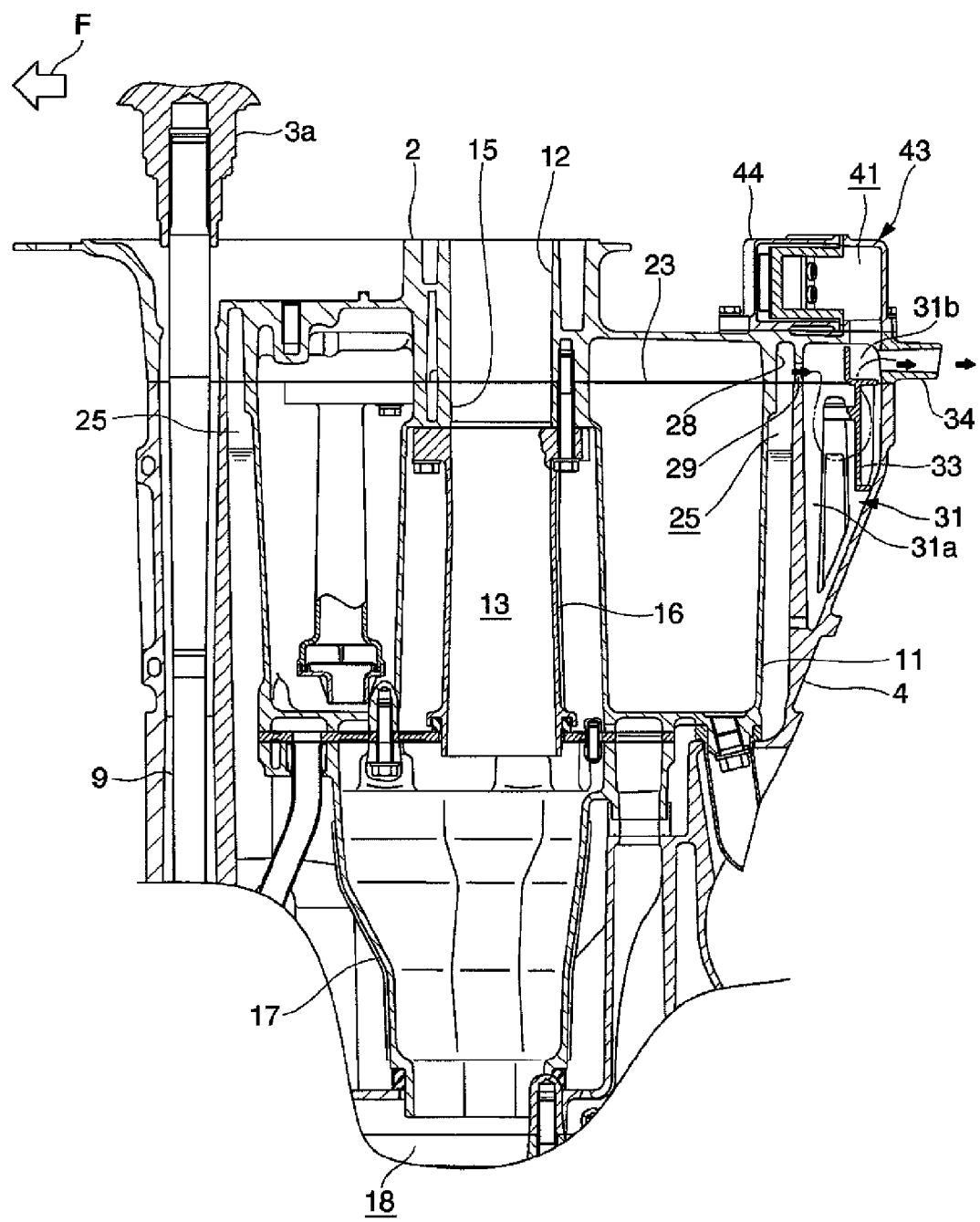
FIG. 2 is a sectional view of a main exhaust passage according to the first preferred embodiment of the present invention.
Figure 3:
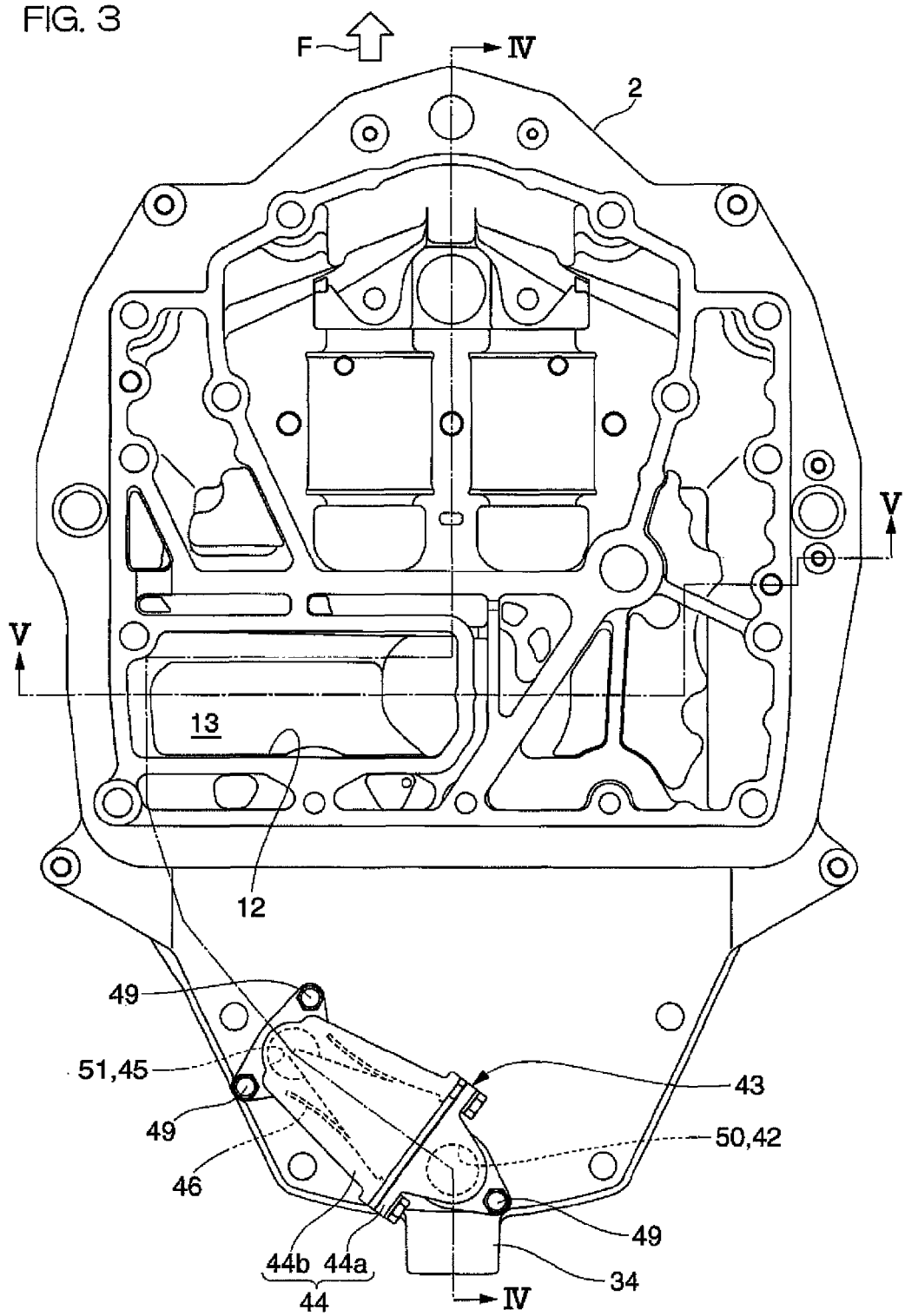
FIG. 3 is a plan view of an exhaust guide according to the first preferred embodiment of the present invention.

As shown in FIG. 2, the main exhaust passage 13 includes a passage 15 provided at an upper portion of the oil pan 11, an exhaust pipe 16 attached to the upper portion of the oil pan 11, a muffler 17 attached to a lower portion of the oil pan 11, and an exhaust passage 18 provided inside the lower casing 5. The main exhaust passage 13 also includes a passage 12 that penetrates vertically through the exhaust guide 2. As shown in FIG. 1, the passage 12 is connected to an exhaust port 3b of the engine 3. The upstream end of the main exhaust passage 13 is thereby connected to the exhaust port 3b of the engine 3.

Also, as shown in FIG. 1, the exhaust apparatus 7 includes an idle exhaust passage 14. An upstream end of the idle exhaust passage 14 is connected to the passage 12 of the main exhaust passage 13. A downstream end of the idle exhaust passage 14 is opened into the atmosphere. When the engine 3 is idled or the hull H1 is propelled at a low speed, a pressure of the exhaust discharged from the engine 3 into the main exhaust passage 13 is low. Thus, in this case, the water that enters into the downstream end of the main exhaust passage 13 is not pushed out by the pressure of the exhaust. Thus, in this case, a large portion of the exhaust gas discharged from the engine 3 is discharged out of the outboard motor 1 through the idle exhaust passage 14.

Figure 4:
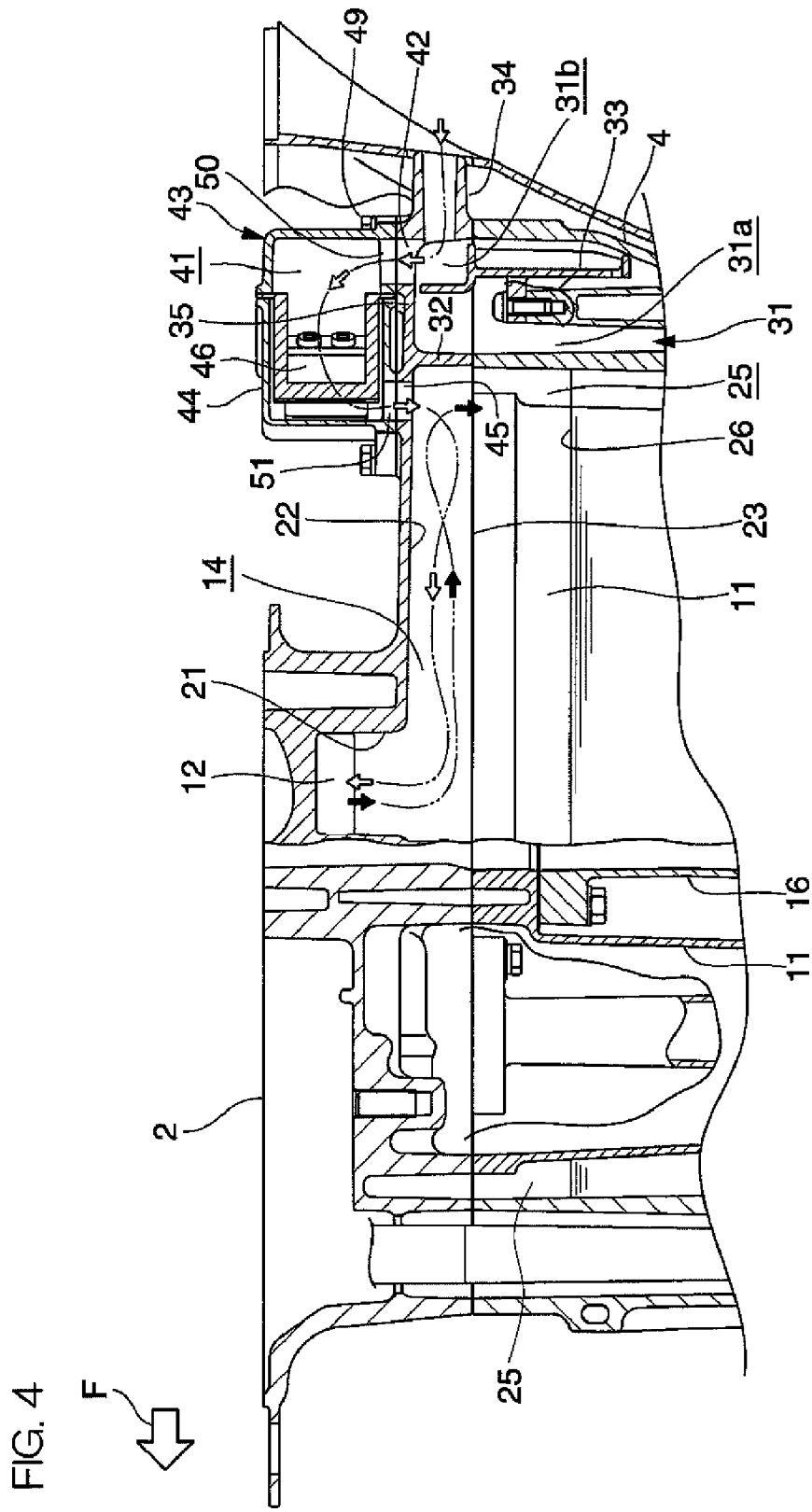
FIG. 4 is a sectional view taken along line IV-IV in FIG. 3.
Figure 5:
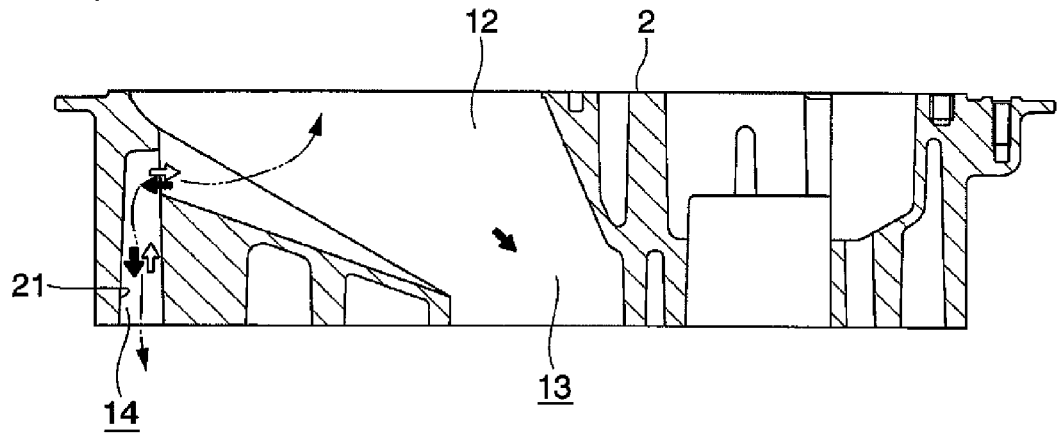
FIG. 5 is a sectional view taken along line V-V in FIG. 3.

As shown in FIG. 5, the idle exhaust passage 14 includes an idling passage 21. The idling passage 21 is arranged to extend vertically inside a left side portion of the exhaust guide 2. An upper end of the idling passage 21 is connected to the passage 12 provided in the exhaust guide 2. Also, as shown in FIG. 4, a lower end of the idling passage 21 opens at a front end portion of a first groove 22 provided at a lower portion of the exhaust guide 2.

Figure 7A:
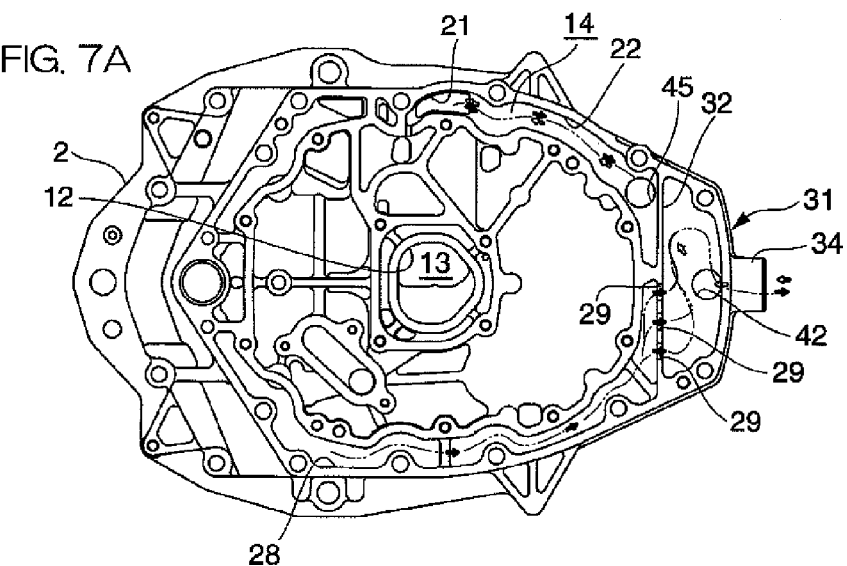
FIG. 7A is a bottom view of the exhaust guide according to the first preferred embodiment of the present invention.

As shown in FIG. 7A, the exhaust guide 2 includes the first groove 22 and a second groove 28 provided at the lower portion of the exhaust guide 2. The first groove 22 is arranged to extend rearward from the idling passage 21 along a left side portion (upper portion in FIG. 7A) of the exhaust guide 2. The second groove 28 is arranged to extend from a front portion to a rear portion of the exhaust guide 2 along a right side portion (lower portion in FIG. 7A) of the exhaust guide 2. The first groove 22 and the second groove 28 are respectively opened downward. The first groove 22 and the second groove 28 are respectively covered by a gasket 23 (see FIG. 7B). As shown in FIG. 4, the gasket 23 is sandwiched by the upper casing 4 and the oil pan 11.

Figure 7B:
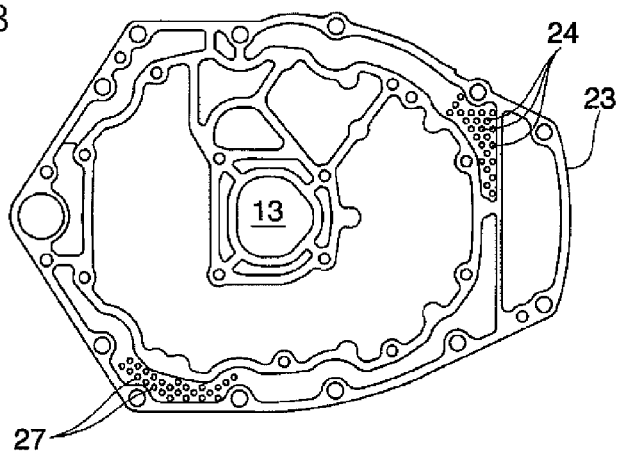
FIG. 7B is a bottom view of a gasket according to the first preferred embodiment of the present invention.

As shown in FIG. 7B, the gasket 23 includes a plurality of rear side through holes 24 and a plurality of front side through holes 27. The plurality of rear side through holes 24 are disposed at positions opposing a rear end portion of the first groove 22. The plurality of front side through holes 27 are disposed at positions opposing a front end portion of the second groove 28. The rear end portion of the first groove 22 is connected to an annular air chamber 25 (see FIG. 7C) via the plurality of rear side through holes 24. The front end portion of the second groove 28 is connected to the air chamber 25 via the plurality of front side through holes 27.

Figure 7C:
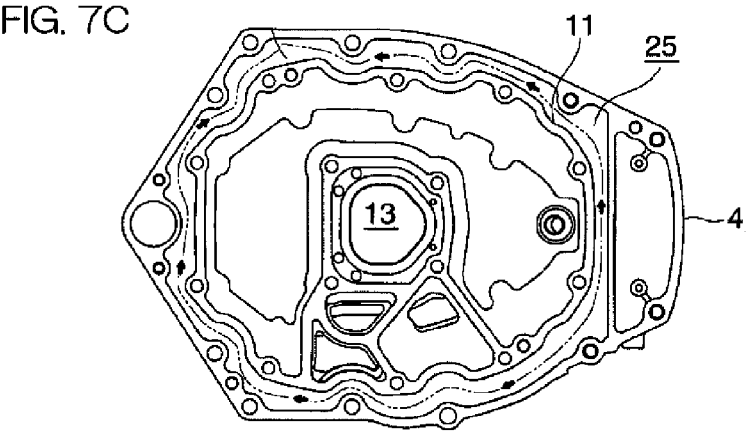
FIG. 7C is a plan view of an upper casing and an oil pan according to the first preferred embodiment of the present invention.

As shown in FIG. 7C, the air chamber 25 is arranged to surround the oil pan 11 in plan view. An outer side and an inner side of the air chamber 25 are defined by the upper casing 4 and the oil pan 11, respectively. Also, as shown in FIG. 4, a lower end and an upper end of the air chamber 25 are defined by cooling water 26, stored between the upper casing 4 and the oil pan 11, and the gasket 23, respectively.

Also, as shown in FIG. 7A, a rear end portion of the second groove 28 is connected to an idle muffler 31 via a plurality of slits 29 provided in the exhaust guide 2. As shown in FIG. 4, the idle muffler 31 is arranged to extend vertically. The idle muffler 31 is, for example, a portion of the exhaust guide 2 and the upper casing 4. That is, a portion of the idle muffler 31 is formed, for example, by a rear portion of the exhaust guide 2 and a rear portion of the upper casing 4.

As shown in FIG. 4, an upper end portion of the idle muffler 31 is positioned to the rear of the first groove 22. The upper end portion of the idle muffler 31 is adjacent to the first groove 22. The idle muffler 31 and the first groove 22 are partitioned by a bulkhead 32. Also, an interior of the idle muffler 31 is partitioned into a front side expansion chamber 31a and a rear side expansion chamber 31b by a partition plate 33. The rear side expansion chamber 31b is connected to the atmosphere via a discharge pipe 34. The discharge pipe 34 is, for example, formed integral with the exhaust guide 2.

The idle exhaust passage 14 is a passage that includes the idling passage 21, the first groove 22, the respective rear side through holes 24, the air chamber 25, the respective front side through holes 27, the second groove 28, the respective slits 29, the idle muffler 31, and the discharge pipe 34. Also, each of the respective rear side through holes 24, the respective front side through holes 27, the respective slits 29, and a gap between walls of the front and rear expansion chambers 31a and 31b and the partition plate 33 is an example of a contraction portion according to the first preferred embodiment of the present invention. Also, each of the air chamber 25, the second groove 28, and the front and rear expansion chambers 31a and 31b is an example of an expansion chamber according to the first preferred embodiment of the present invention.

Also, as shown in FIG. 4, the outboard motor 1 includes a bypass passage 41. The bypass passage 41 is a passage connecting the upstream end and the downstream end of the idle exhaust passage 14. The bypass passage 41 includes a through hole 42 penetrating vertically through an upper wall 35 of the idle muffler 31, a housing 44 of a lead valve 43 disposed above the idle muffler 31, and a through hole 45 connected to a rear end portion of the first groove 22. An upstream end of the bypass passage 41 is connected to the idle exhaust passage 14 at a downstream side relative to the sound-muffling contraction portions and expansion chambers provided in the idle exhaust passage 14. A downstream end of the bypass passage 41 is connected to the idle exhaust passage 14 at an upstream side relative to the sound-muffling contraction portions and expansion chambers provided in the idle exhaust passage 14.

Figure 6:
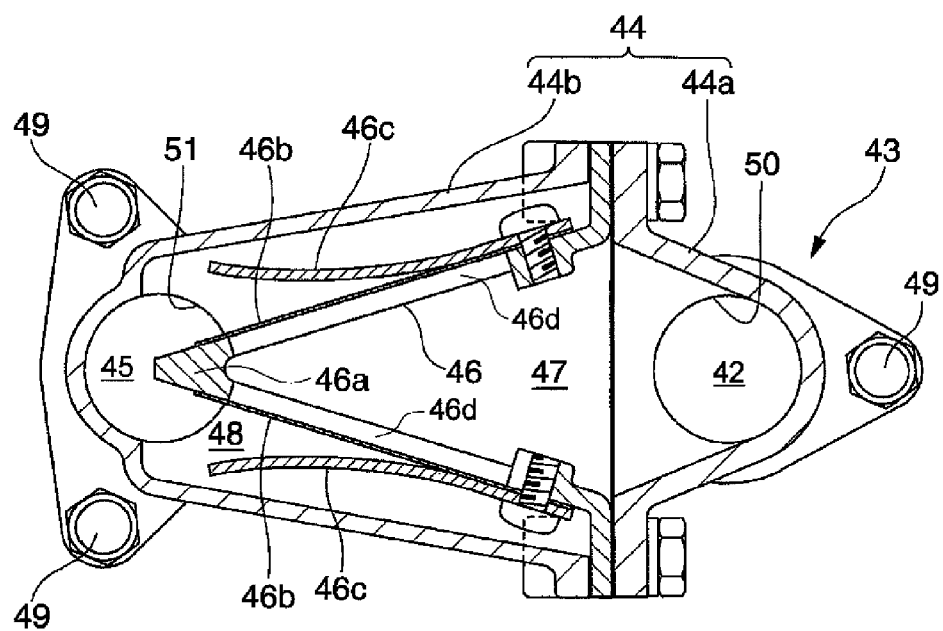
FIG. 6 is a transverse sectional view of a lead valve according to the first preferred embodiment of the present invention.

Also, the lead valve 43 is an example of a check valve according to the first preferred embodiment of the present invention. To improve heat resistance, the lead valve 43 preferably includes a member with excellent heat resistance (for example, a member other than a seal member made of rubber). As shown in FIG. 6, the lead valve 43 includes a housing 44 and a lead valve main body 46. The housing 44 is an example of a housing according to the first preferred embodiment of the present invention. An interior of the housing 44 is partitioned into an upstream chamber 47 and a downstream chamber 48 by the lead valve main body 46. The housing 44 is fixed to the exhaust guide 2 preferably by a plurality of fixing bolts 49, for example.

Also, as shown in FIG. 6, the housing 44 includes an upstream side housing 44a and a downstream side housing 44b that are coupled to each other. The upstream side housing 44a and the downstream side housing 44b include a through hole 50 and a through hole 51, respectively. The through hole 50 and the through hole 51 are connected to the through hole 42 and the through hole 45, respectively.

Also, as shown in FIG. 6, the lead valve main body 46 includes a frame 46a and a plurality of valve elements 46b, and a plurality of presser plates 46c. The frame 46a is held by the housing 44. The valve elements 46b and the presser plates 46c are respectively fixed to the frame 46a. Each valve element 46b preferably has, for example, a plate-shape. Each valve element 46b preferably includes, for example, a plate made of stainless steel.

As shown in FIG. 6, the frame 46a includes a plurality of passages 46d. The plurality of passages 46d are respectively covered by the plurality of valve elements 46b. That is, each passage 46d is closed by the corresponding valve element 46b. When the pressure in the downstream chamber 48 is lower than the pressure in the upstream chamber 47, the respective valve elements 46b deform elastically and the respective passages 46d are opened. The lead valve 43 is arranged such that air flows only from an upstream side (idle muffler 31 side) to a downstream side (first groove 22 side) of the lead valve 43.

As mentioned above, when the engine 3 is idled or the hull H1 is propelled at a low speed, a large portion of the exhaust gas discharged from the engine 3 is discharged out of the outboard motor 1 through the idle exhaust passage 14. Specifically, as indicated by solid arrows in FIG. 5, the exhaust gas is discharged from the engine 3 into the passage 12 of the exhaust guide 2 and flows into the idling passage 21. Then, as indicated by solid arrows in FIG. 4, the exhaust gas flows rearward inside the first groove 22, passes through the respective rear side through holes 24 of the gasket 23 (see FIG. 7B), and flows into the air chamber 25 inside the upper casing 4. Then, as indicated by solid arrows in FIG. 7C, the exhaust gas flows inside the air chamber 25 to positions opposing the respective front side through holes 27 of the gasket 23 (see FIG. 7B). The exhaust gas then passes through the respective front side through holes 27 and flows into the front end portion of the second groove 28 (see FIG. 7A). As indicated by solid arrows in FIG. 7A, the exhaust gas that flows into the second groove 28 flows rearward inside the second groove 28, passes through the respective slits 29, and flows into the front side expansion chamber 31a of the idle muffler 31 (see FIG. 2). Then, as indicated by the solid arrows in FIG. 2, the exhaust gas flows from the front side expansion chamber 31a into the rear side expansion chamber 31b and is discharged into air through the discharge pipe 34. An exhaust noise during discharge of the exhaust gas from the idle exhaust passage 14 is muffled by the exhaust gas being expanded and contracted inside the idle exhaust passage 14.

Also, when in a state in which the hull H1 is propelled forward by the outboard motor 1, the forward-reverse switching mechanism 8 is switched from the forward drive state to the reverse drive state, the propeller 6 may be pushed by a water stream and rotate in the forward drive direction. In this case, the engine 3 is reversed because the propeller 6 is rotated in the forward drive direction in opposition to the rotation of the propeller 6 in the reverse drive direction by the engine 3. Air inside the main exhaust passage 13 is sucked into the engine 3 and the pressure inside the main exhaust passage 13 becomes negative (a pressure lower than the atmospheric pressure). The idle exhaust passage 14 is connected to the main exhaust passage 13. Thus, when the pressure inside the main exhaust passage 13 is negative, the negative pressure acts on the idle exhaust passage 14. The negative pressure also acts on the bypass passage 41 because the bypass passage 41 is connected to the exhaust passage 14.

When the negative pressure acts on the idle exhaust passage 14, the air outside the outboard motor 1 is sucked into the downstream end of the idle exhaust passage 14 from the exit (opening of the discharge pipe 34) of the idle exhaust passage 14. The air sucked into the downstream end of the idle exhaust passage 14 is supplied to the main exhaust passage 13 through the idle exhaust passages 14. However, the idle exhaust passage 14 includes the noise muffling contraction portions and expansion chambers, and thus the air flowing toward the main exhaust passage 13 through the idle exhaust passage 14 receive resistance from the noise muffling contraction portions and expansion chambers. The air may thus not be supplied to the main exhaust passage 13 at an adequate flow rate. The negative pressure in the main exhaust passage 13 may thus not be eliminated.

Meanwhile, when the negative pressure acts on the bypass passage 41, the pressure in the downstream chamber 48 of the lead valve 43 becomes lower than the pressure in the upstream chamber 47. The lead valve 43 thus opens and the air inside the upstream chamber 47 is sucked into the downstream chamber 48. Thus, as indicated by open arrows in FIG. 4, the air sucked into the downstream end of the idle exhaust passage 14 is sucked into the lead valve 43 and flows into the idle exhaust passage 14 (inside the first groove 22) from the lead valve 43. That is, the air sucked into the downstream end of the idle exhaust passage 14 flows into the idle exhaust passage 14 while bypassing the noise muffling contraction portions and expansion chambers provided in the idle exhaust passage 14. The air that moves into the idle exhaust passage 14 is supplied to the main exhaust passage 13.

Noise muffling contraction portions and expansion chambers are not provided in the bypass passage 41, and thus the resistance applied to the air flowing toward the main exhaust passage 13 through the bypass passage 41 is lower than the resistance applied to the air passing through the idle exhaust passage 14. Air is thus supplied at an adequate flow rate to the main exhaust passage 13. The negative pressure in the main exhaust passage 13 is thereby eliminated. The water that enters the downstream end of the main exhaust passage 13 is thereby prevented from rising caused by negative pressure.

Examples of technical effects and merits of the outboard motor according to the first preferred embodiment of the present invention shall now be described.

In the first preferred embodiment of the present invention, the bypass passage 41 and the lead valve 43 are provided in the main exhaust passage 13. A portion of the idle exhaust passage 14 is also used for eliminating the negative pressure in the main exhaust passage 13. Thus, by the addition of the bypass passage 41 and the lead valve 43 to an outboard motor provided with the idle exhaust passage, the negative pressure in the main exhaust passage 13 is eliminated reliably. Also, in this case, the negative pressure in the main exhaust passage 13 is eliminated reliably while reducing cost increase of the outboard motor 1.

Also, in the first preferred embodiment of the present invention, the bypass passage 41 is connected to the main exhaust passage 13 via the idle exhaust passage 14. Thus, in comparison to a case where the bypass passage 41 is connected directly to the main exhaust passage 13, the exhaust noise transmitted from the main exhaust passage 13 to the bypass passage 41 is small. The noise transmitted to the exterior of the outboard motor 1 through the lead valve 43 when the lead valve 43 opens is thus reduced. Also, in comparison to the case where the bypass passage 41 is connected directly to the main exhaust passage 13, a heat amount transmitted to the bypass passage 41 is small. A thermal stress applied to the lead valve 43 is thus reduced.

Also, in the first preferred embodiment of the present invention, a portion of the bypass passage 41 is defined by the exhaust guide 2, the upper casing 4, and the oil pan 11. These members are members that can withstand the heat of the exhaust gas. Thus, no problem whatsoever occurs even when the heat of the exhaust gas passing through the bypass passage 41 is transmitted to these members.

Also, in the first preferred embodiment of the present invention, the downstream end of the idle exhaust passage 14 is opened into the atmosphere. The pressure at the downstream end of the idle exhaust passage 14 is thus stabilized at substantially the atmospheric pressure. The flow rate of the air sucked into the bypass passage 41 when the pressure inside the main exhaust passage 13 is negative is thus not influenced by operation circumstances of the engine 3. Air is thereby supplied to the main exhaust passage 13 at a stable flow rate when the pressure inside the main exhaust passage 13 is negative.

Also, in the first preferred embodiment of the present invention, the lead valve 43 is arranged to open and close automatically according to the pressure in the main exhaust passage 13. The cost of the outboard motor 1 is thus reduced in comparison to a case where a valve including an actuator arranged to open and close the valve is provided in the outboard motor 1 in place of the lead valve 43.

In the first preferred embodiment of the present invention, the exit of the idle exhaust passage 14 (opening of the discharge pipe 34) may have a first opening area of a minimum necessary size that allows passage of the exhaust gas. In this case, the noise transmitted to the downstream end of the idle exhaust passage 14 through the bypass passage 41 when the lead valve 43 opens is reduced at the exit of the idle exhaust passage 14.

Also, in the first preferred embodiment of the present invention, the exit of the idle exhaust passage 14 may have a second opening area of a size that allows passage of air at an adequate flow rate at which the negative pressure inside the main exhaust passage 13 is eliminated reliably. In this case, air is supplied at an adequate flow rate into the main exhaust passage 13 when the pressure inside the main exhaust passage 13 is negative. The negative pressure inside the main exhaust passage 13 is thereby eliminated immediately. Also, in a case where the exit of the idle exhaust passage 14 has a large opening area, the exhaust noise is hardly reduced at the exit of the idle exhaust passage 14 when the exhaust gas passes through the idle exhaust passage 14 and exits from the exit of the idle exhaust passage 14. However, the idle exhaust passage 14 includes the sound muffling contraction portions and expansion chambers, and thus a large noise is not emitted from the exit of the idle exhaust passage 14 during idling of the engine 3.

Second Preferred Embodiment

Figure 8:
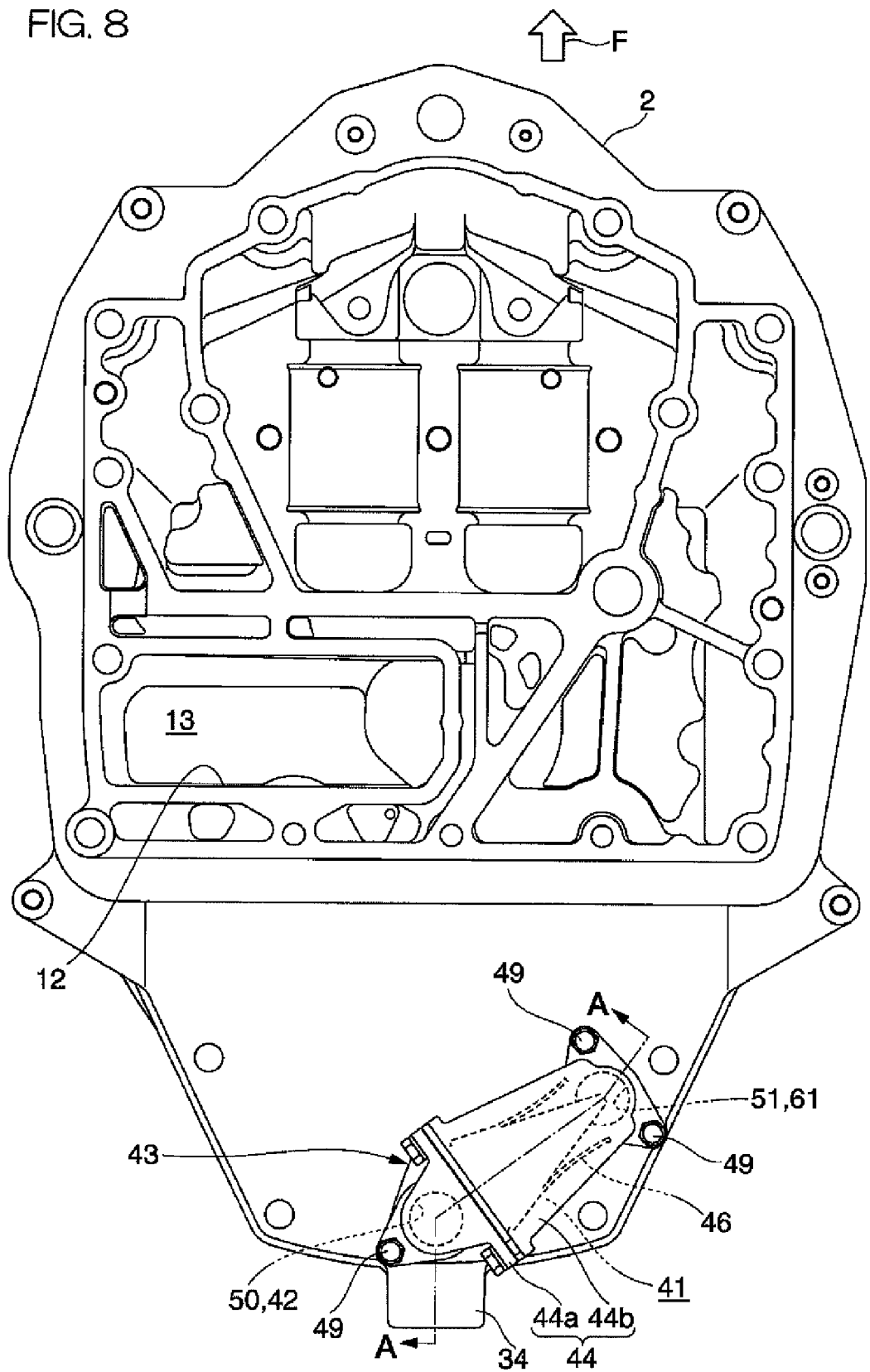
FIG. 8 is a plan view of an exhaust guide according to a second preferred embodiment of the present invention.

An outboard motor according to a second preferred embodiment of the present invention shall now be described with reference to FIG. 8 to FIG. 10. In FIG. 8 to FIG. 10, component portions equivalent to respective portions shown in FIG. 1 to FIG. 7C are provided with the same reference symbols as in FIG. 1 to FIG. 7C and description thereof shall be omitted where appropriate.

As shown in FIG. 8 and FIG. 10, the lead valve 43 is provided on the exhaust guide 2. The through hole 51 provided in the downstream side housing 44*b* of the lead valve 43 is connected to a through hole 61 provided in the rear end portion of the second groove 28. The downstream end of the bypass passage 41 is thereby connected to the second groove 28. Also, as shown in FIG. 10, the upstream end of the bypass passage 41 is connected to the rear side expansion chamber 31*b* of the idle muffler 31. The second groove 28 is thus connected to the rear side expansion chamber 31*b* of the idle muffler 31 via the bypass passage 14. The air that is sucked into the discharge pipe 34 when the pressure inside the main exhaust passage 13 is negative flows into the second groove 28 through the bypass passage 41. That is, the air sucked into the discharge pipe 34 flows into the second groove 28 while bypassing the idle muffler 31.

Figure 9A:
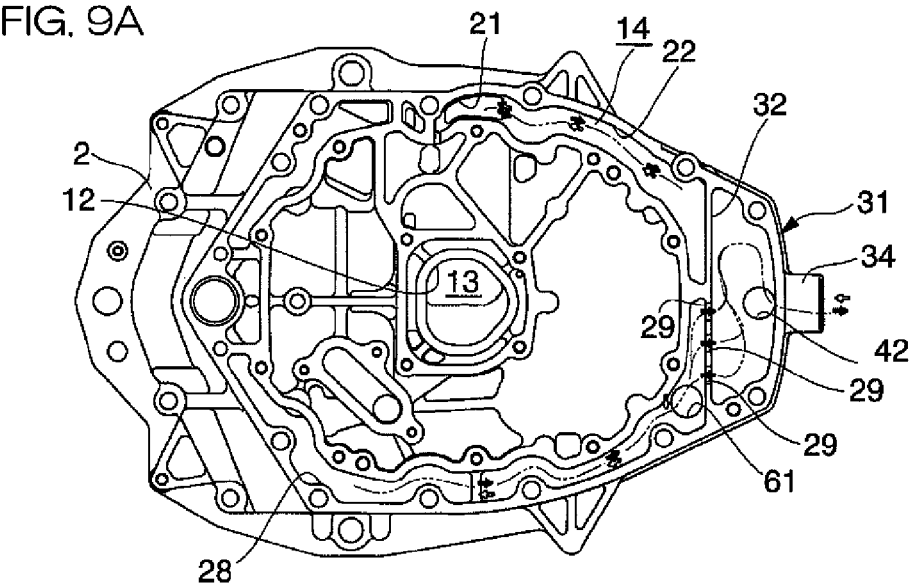
FIG. 9A is a bottom view of the exhaust guide according to the second preferred embodiment of the present invention.
Figure 9B:
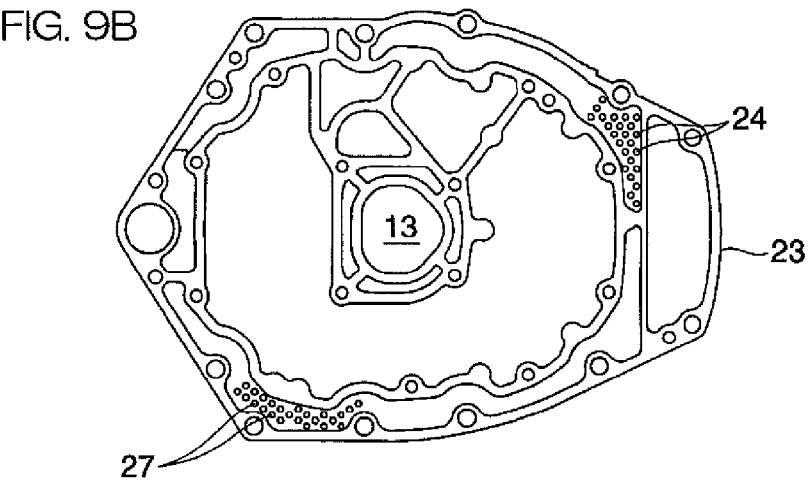
FIG. 9B is a bottom view of a gasket according to the second preferred embodiment of the present invention.
Figure 9C:
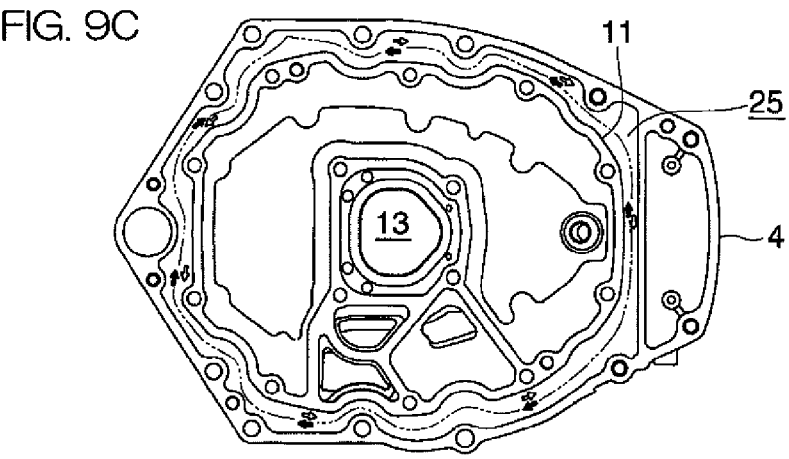
FIG. 9C is a plan view of an upper casing and an oil pan according to the second preferred embodiment of the present invention.
Figure 10:
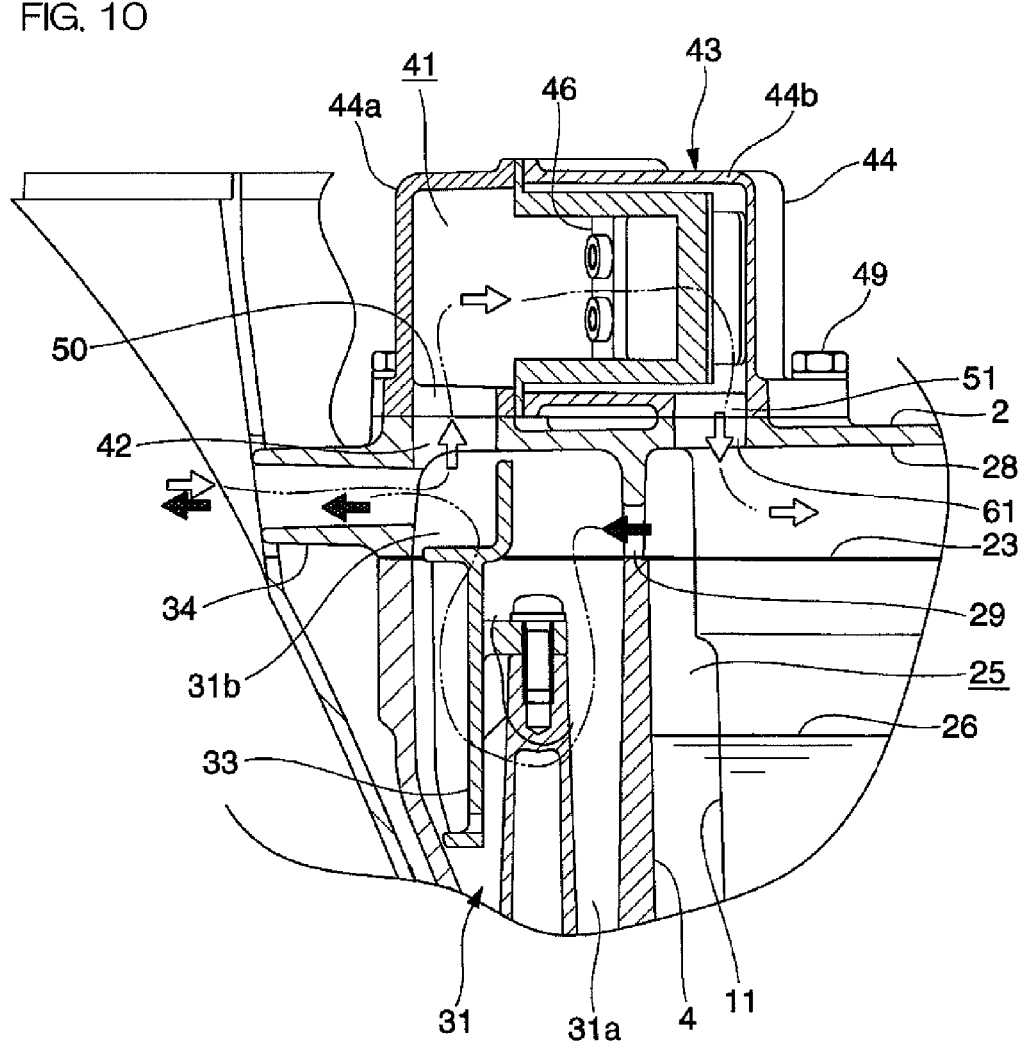
FIG. 10 is a sectional view taken along line A-A in FIG. 8.

As indicated by open arrows in FIG. 9A, the air that flows into the second groove 28 flows through the second groove 28 in a direction opposite to that during idling. The air then flows into a front portion of the air chamber 25 (see FIG. 9C) through the respective front side through holes 27 of the gasket 23 (see FIG. 9B). Next as indicated by open arrows in FIG. 9C, the air flows through the air chamber 25 toward a rear portion of the air chamber 25. The air then flows into the rear end portion of the first groove 22 (see FIG. 9A) through the respective rear side through holes 24 of the gasket 23 (see FIG. 9B). As indicated by open arrows in FIG. 9A, the air that flows into the first groove 22 is sucked into the main exhaust passage 13 through the idling passage 21. Thus, effects and advantages equivalent to those of the outboard motor according to the first preferred embodiment of the present invention are provided by the outboard motor according to the second preferred embodiment of the present invention as well.

Also, the upstream end of the bypass passage 41 is connected to the idle exhaust passage 14 at the downstream side relative to the noise muffling contraction portions and expansion chambers provided in the idle muffler 31. The noise muffling contraction portions provided in the idle muffler 31 are, for example, the passages of narrow width provided in a periphery of the partition plate 33 inside the idle muffler 31, and the respective slits 29 (see FIG. 10). Also, the downstream end of the bypass passage 41 is connected to the idle exhaust passage 14 at the upstream side relative to the noise muffling contraction portions and expansion chambers provided in the idle muffler 31. More specifically, the downstream end of the bypass passage 41 is connected to the idle exhaust passage 14 at a portion between the idle muffler 31 and the other contraction portions provided in the idle exhaust passage 14 (the respective rear side through holes 24 and the respective front side through holes 27 of the gasket 23). Each of the respective rear side through holes 24 and the respective front side through holes 27 of the gasket 23 is an example of an upstream side contraction portion according to the second preferred embodiment of the present invention.

When the engine 3 is idled or when the hull H1 is propelled at a low speed, the exhaust gas is discharged through the idle exhaust passage 14. Also, exhaust noise is generated by the exhaust gas flowing through the idle exhaust passage 14. This exhaust noise is reduced by the exhaust gas passing through the noise-muffling contraction portions and expansion chambers provided in the idle exhaust passage 14. The downstream end of the bypass passage 41 is connected to the idle exhaust passage 14 at the downstream side relative to the contraction portions (the respective rear side through holes 24 and the respective front side through holes 27 of the gasket 23). The exhaust noise transmitted to the downstream end of the bypass passage 41 from the idle exhaust passage 14 is thus reduced to some degree by the exhaust gas passing through the contraction portions. The exhaust noise transmitted to the discharge pipe 34 from the bypass passage 41 is thus reduced, and the exhaust noise emitted from the discharge pipe 34 is reduced.

Third Preferred Embodiment

An outboard motor according to a third preferred embodiment of the present invention shall now be described with reference to FIG. 11 to FIG. 15. In FIG. 11 to FIG. 15, component portions equivalent to respective portions shown in FIG. 1 to FIG. 7C are provided with the same reference symbols as in FIG. 1 to FIG. 7C and description thereof shall be omitted where appropriate.

Figure 11:
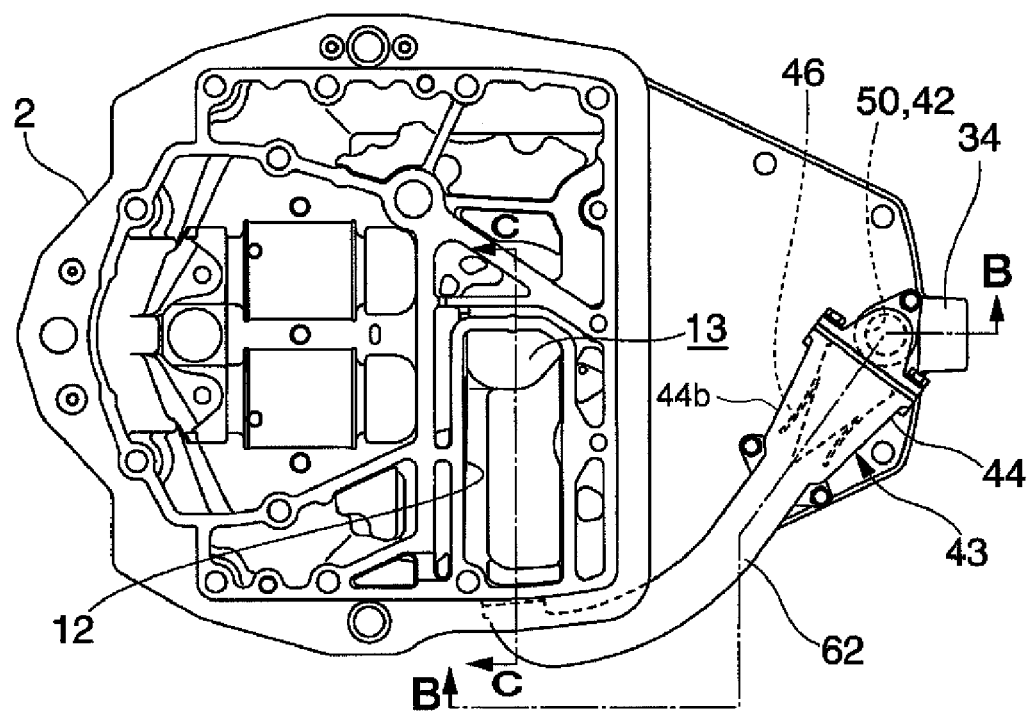
FIG. 11 is a plan view of an exhaust guide according to a third preferred embodiment of the present invention.
Figure 12:
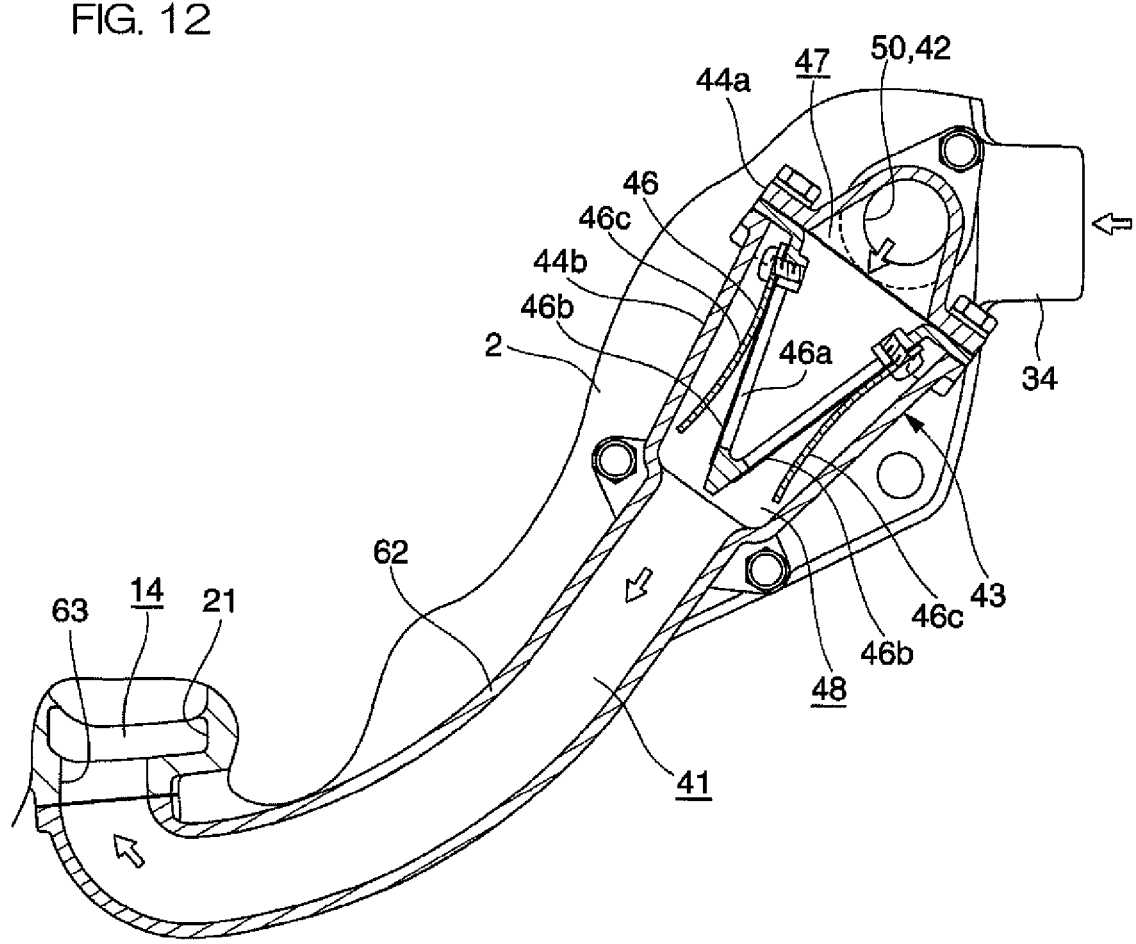
FIG. 12 is a transverse sectional view of a pipe and a lead valve according to the third preferred embodiment of the present invention.

As shown in FIG. 11, the lead valve 43 includes a pipe 62 extending obliquely forward from the downstream side housing 44b. The pipe 62 is an example of a pipe according to the third preferred embodiment of the present invention. The pipe 62 is, for example, integral with the downstream side housing 44b. A front end portion of the pipe 62 is attached to a left side portion of the exhaust guide 2. As shown in FIG. 12, the front end portion of the pipe 62 is connected to the idling passage 21 via a through hole 63. The lead valve 43 is arranged such that all of the air that passes through the lead valve main body 46 flows into the pipe 62.

Figure 13:
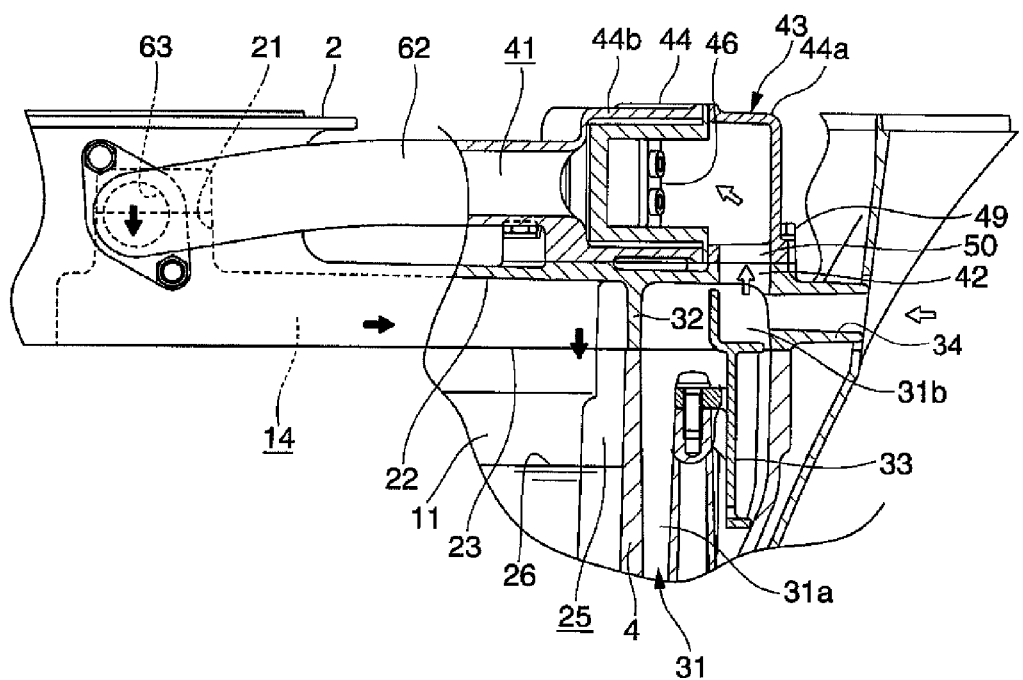
FIG. 13 is a sectional view taken along line B-B in FIG. 11.
Figure 14:
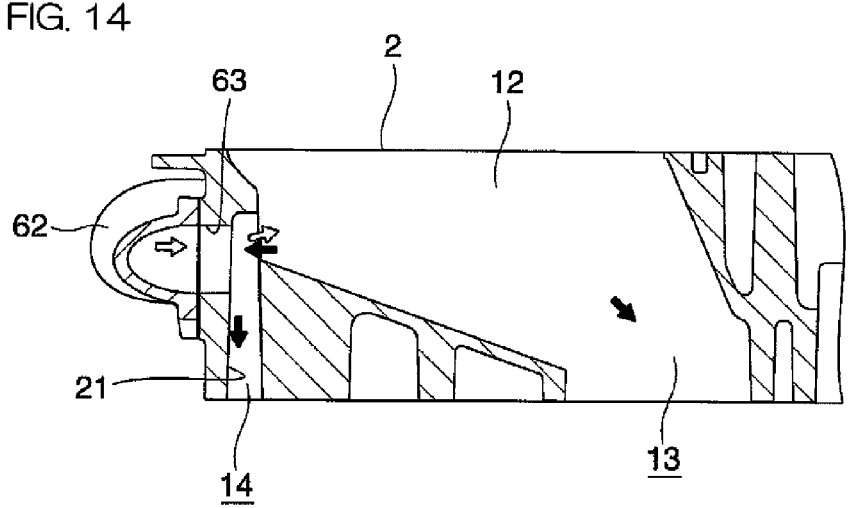
FIG. 14 is a sectional view taken along line C-C in FIG. 11.
Figure 15:
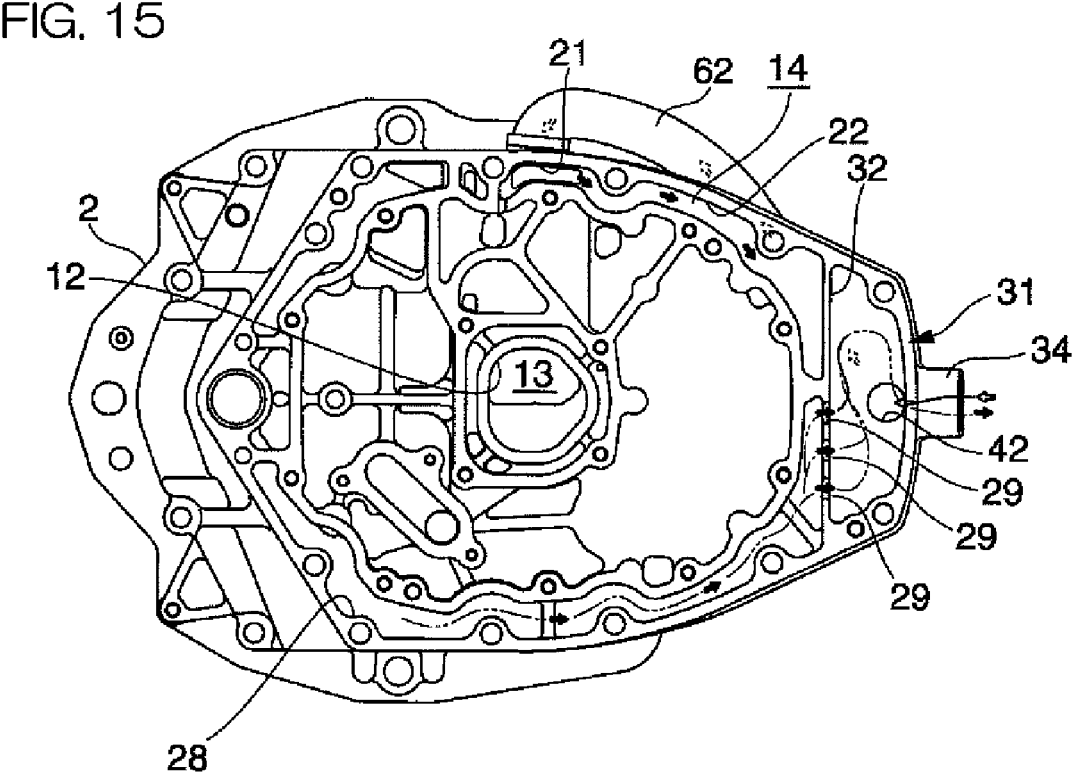
FIG. 15 is a bottom view of the exhaust guide according to the third preferred embodiment of the present invention.

When the pressure inside the main exhaust passage 13 is negative, as indicated by open arrows in FIG. 13 and FIG. 15, the air that is sucked into the rear side expansion chamber 31b of the idle muffler 31 from the discharge pipe 34 is sucked into the lead valve 43 through the through hole 42 and the through hole 50. As indicated by open arrows in FIG. 12, the air that flows into the lead valve 43 is then sucked into the idling passage 21 through the pipe 62 and the through hole 63. As indicated by open arrows in FIG. 14, the air that flows into the idling passage 21 is sucked into the main exhaust passage 13. That is, the air that is sucked into the rear side expansion chamber 31b of the idle muffler 31 from the discharge pipe 34 is sucked into the main exhaust passage 13 upon successively passing through the through holes 42 and 50, the lead valve 43, the pipe 62, the through hole 63, and the idling passage 21. Thus, effects and advantages equivalent to those of the outboard motors according to the first and second preferred embodiments of the present invention are provided by the outboard motor according to the third preferred embodiment of the present invention as well.

Fourth Preferred Embodiment

An outboard motor according to a fourth preferred embodiment of the present invention shall now be described with reference to FIG. 16 to FIG. 22. In FIG. 16 to FIG. 22, component portions equivalent to respective portions shown in FIG. 1 to FIG. 7C are provided with the same reference symbols as in FIG. 1 to FIG. 7C and description thereof shall be omitted where appropriate.

Figure 16:
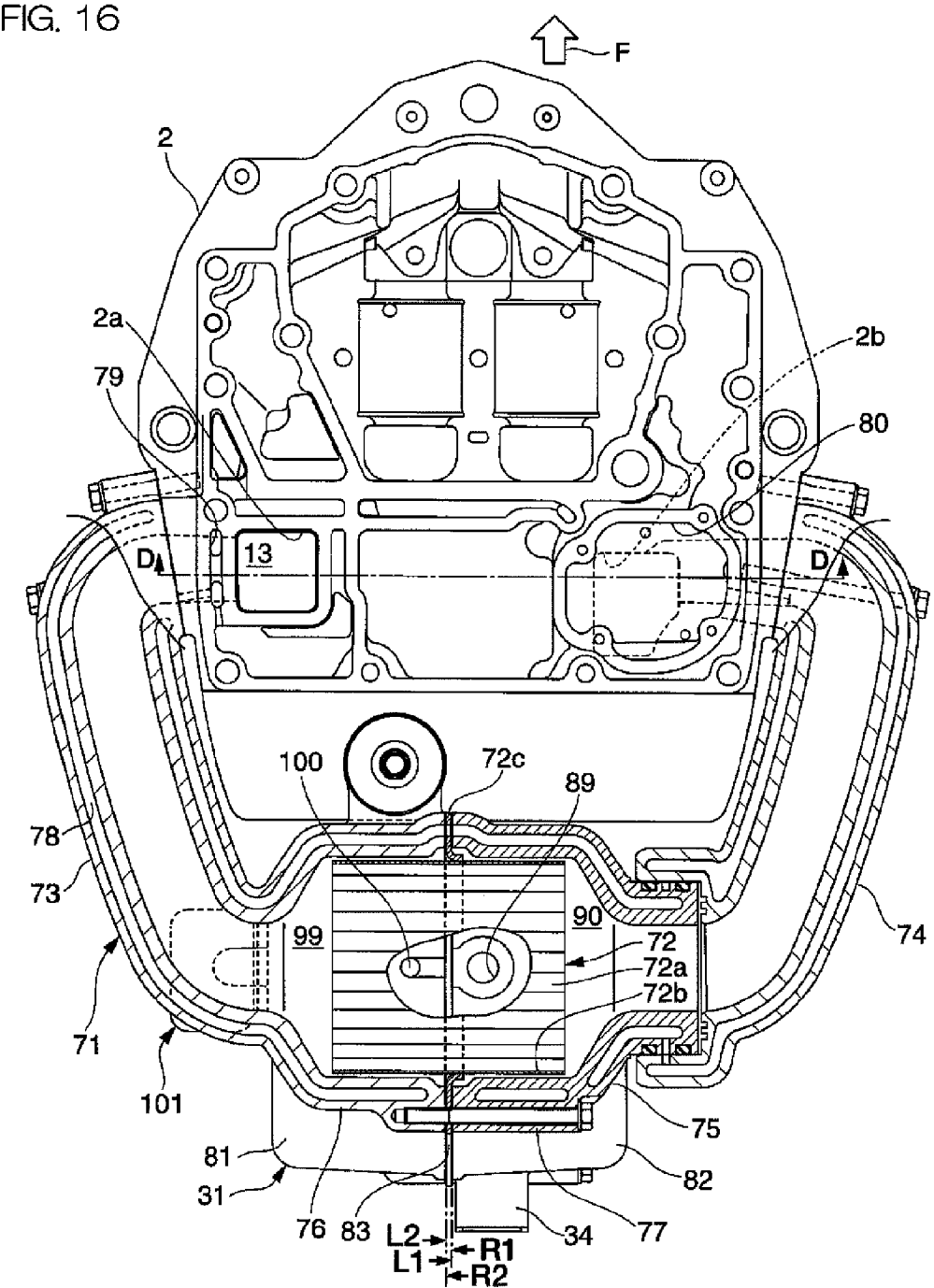
FIG. 16 is a plan view of an exhaust guide according to a fourth preferred embodiment of the present invention.

As shown in FIG. 16, the main exhaust passage 13 includes an exhaust pipe 71 attached to the exhaust guide 2. The exhaust pipe 71 is disposed in a vicinity of the engine 3 (see FIG. 1). The exhaust pipe 71 is arranged to extend along a horizontal plane. The exhaust gas that flows into the exhaust pipe 71 flows substantially horizontally in the vicinity of the engine 3. The exhaust gas that flows into the exhaust pipe 71 is cleaned by a catalyst 72 disposed inside the exhaust pipe 71. The catalyst 72 is, for example, a three-way catalyst. A three-way catalyst is a catalyst that can simultaneously clean hydrocarbons, nitrogen oxides, and carbon monoxide in the exhaust gas during combustion in a vicinity of a theoretical air-fuel ratio.

Figure 17:
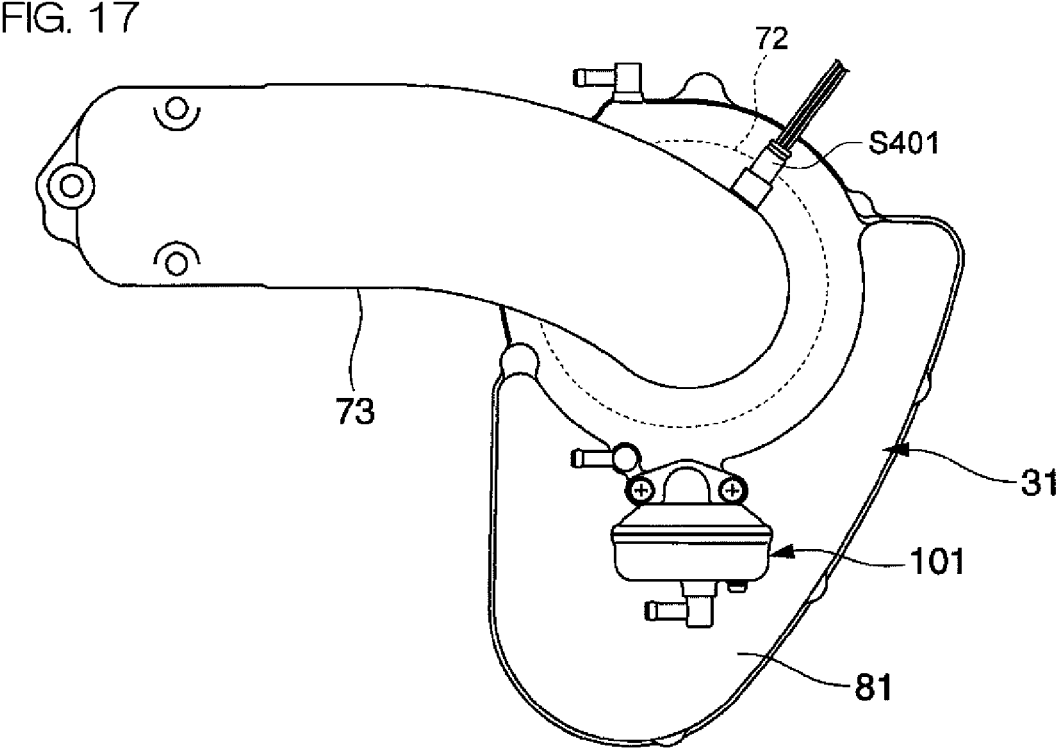
FIG. 17 is a left side view of a left exhaust pipe according to the fourth preferred embodiment of the present invention.
Figure 18:
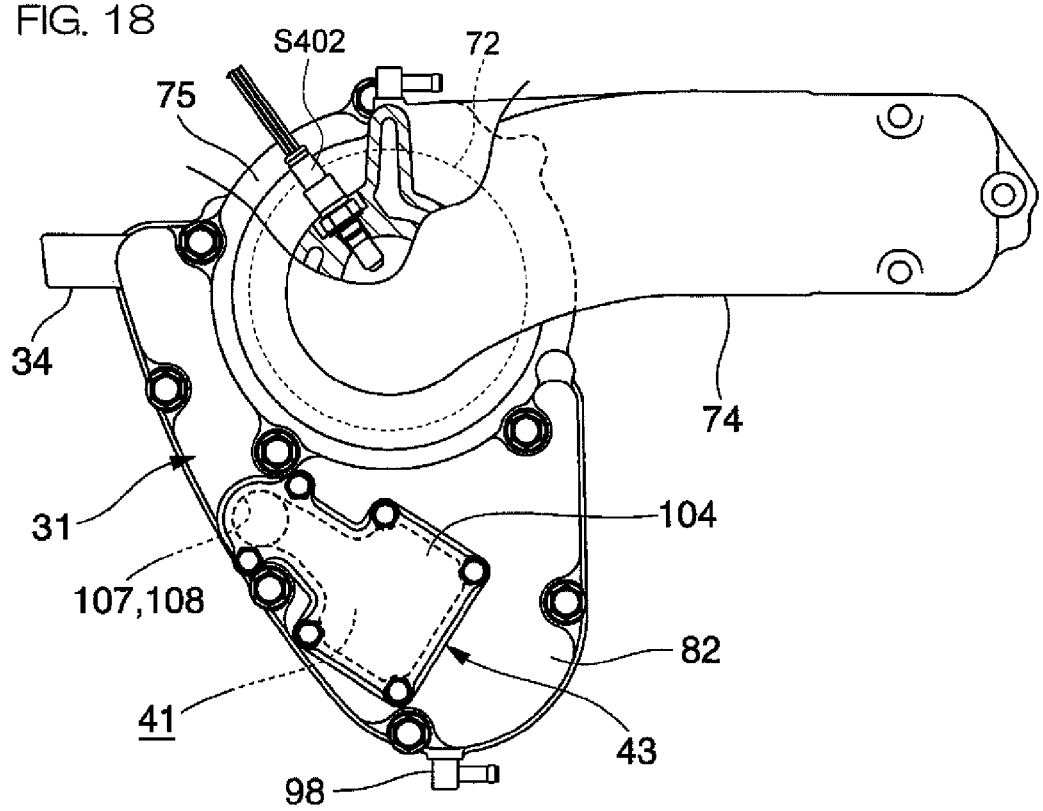
FIG. 18 is a right side view of a right exhaust pipe according to the fourth preferred embodiment of the present invention.

An air-fuel ratio is detected by an upstream side sensor S401 (see FIG. 17). An oxygen concentration of the exhaust gas that passes through the catalyst 72 is detected by a downstream side sensor S402 (see FIG. 18). The upstream side sensor S401 and the downstream side sensor S402 are, for example, oxygen concentration sensors that include a ceramic, such as zirconia. As shown in FIG. 17, the upstream side sensor S401 is disposed at the upstream side of the catalyst 72. Also, as shown in FIG. 18, the downstream side sensor S402 is disposed at the downstream side of the catalyst 72. The upstream side sensor S401 and the downstream side sensors 402 are disposed in a vicinity of the catalyst 72.

Also, as shown in FIG. 16, the exhaust pipe 71 includes a left side exhaust pipe 73, a right side exhaust pipe 74, and a communicating pipe 75. Each of the left side exhaust pipe 73 and the communicating pipe 75 is an example of an exhaust pipe according to the fourth preferred embodiment of the present invention. Front end portions of the left side exhaust pipe 73 and the right side exhaust pipe 74 are fixed respectively to a left side portion and a right side portion of the exhaust guide 2. The communicating pipe 75 is disposed between rear end portions of the left side exhaust pipe 73 and the right side exhaust pipe 74. A left end portion of the communicating pipe 75 is fixed to the rear end portion of the left side exhaust pipe 73. Also, a right end portion of the communicating pipe 75 is fitted inside the rear end portion of the right side exhaust pipe 74. The right end portion of the communicating pipe 75 is movable with respect to the rear end portion of the right side exhaust pipe 74.

Also, as shown in FIG. 16, the exhaust pipe 71 includes a cooling water passage 78 provided in the left side exhaust pipe 73, the right side exhaust pipe 74, and the communicating pipe 75. The cooling water passage 78 is connected to a cooling water passage 79 and a cooling water passage 80 that are provided in the exhaust guide 2. The cooling water passage 79 and the cooling water passage 80 provided in the exhaust guide 2 are thus connected to each other via the cooling water passage 78.

Also, the catalyst 72 is, for example, a metal catalyst. A metal catalyst is a catalyst that includes a carrier made of a metal, such as stainless steel. As shown in FIG. 16, the catalyst 72 includes a carrier 72a, a cylinder 72b, and a fixing flange 72c. The carrier 72a is made of a metal, such as stainless steel. The carrier 72a is inserted inside the cylinder 72b. The fixing flange 72c is fixed, for example, by welding to an outer peripheral portion of the cylinder 72b at an intermediate position in relation to an axial direction of the cylinder 72b.

Figure 20:
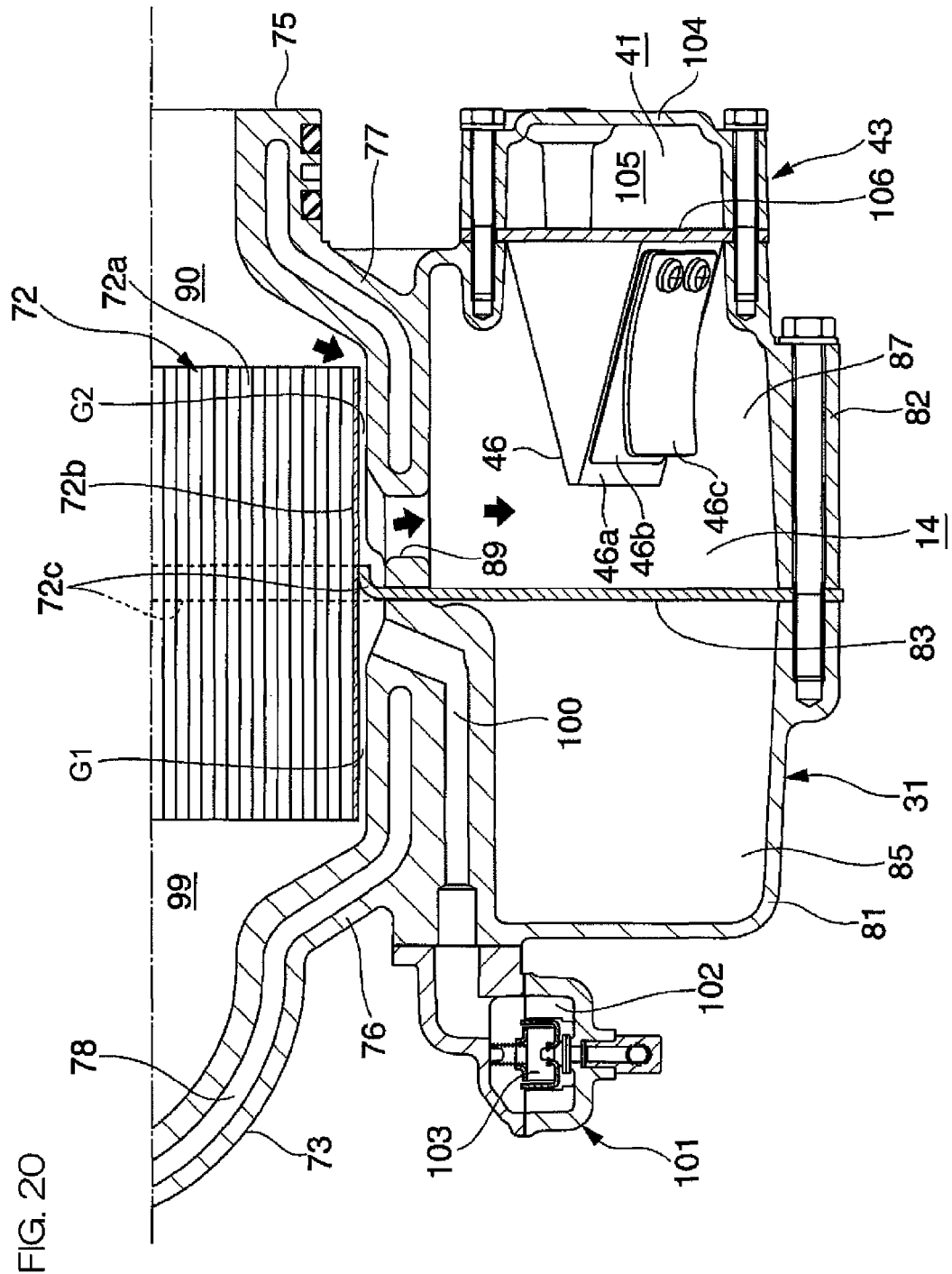
FIG. 20 is a sectional view of an idle muffler according to the fourth preferred embodiment of the present invention.

As shown in FIG. 16, the carrier 72a and the cylinder 72b are housed in a left side catalyst housing 76, provided at a rear end portion of the left side exhaust pipe 73, and in a right side catalyst housing 77, provided at the communicating pipe 75. The fixing flange 72c is held in a state of being sandwiched by the left side catalyst housing 76 and the right side catalyst housing 77. As shown in FIG. 20, an inner surface of the left side catalyst housing 76 surrounds the cylinder 72b across an annular gap G1. Also, an inner surface of the right side catalyst housing 77 surrounds the cylinder 72b across an annular gap G2.

Figure 19:
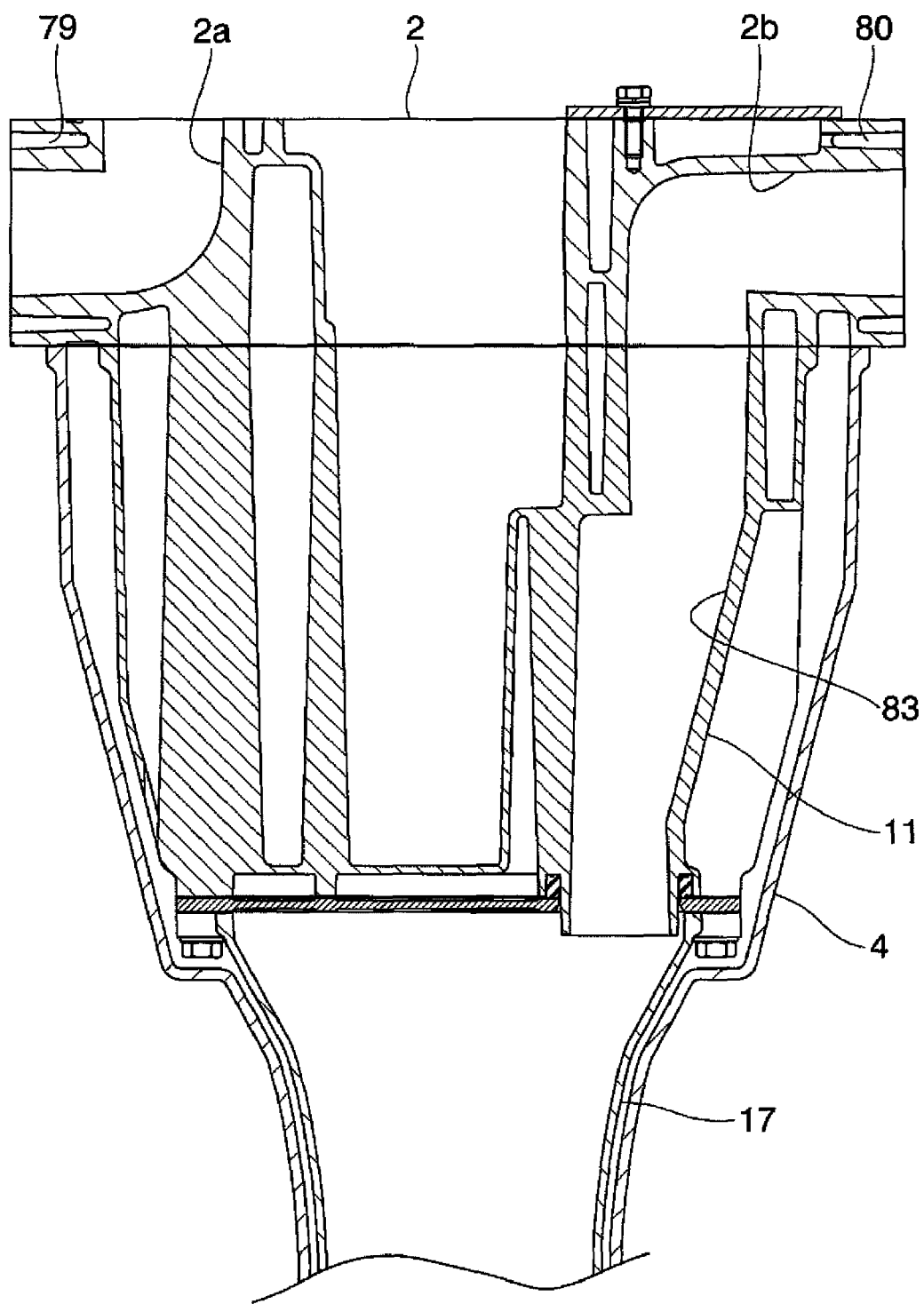
FIG. 19 is a sectional view of a main exhaust passage taken along line D-D in FIG. 16.

Also, as shown in FIG. 19, the main exhaust passage 13 includes an upstream side passage 2a and a downstream side passage 2b. The upstream side passage 2a and the downstream side passage 2b are respectively provided inside a left side portion and inside a right side portion of the exhaust guide 2. The upstream side passage 2a is a passage corresponding to the upstream end of the main exhaust passage 13. The upstream side passage 2a includes a left opening that is directed to the left and an upper opening that is directed upward. The exhaust gas of the engine 3 flows into the upstream side passage 2a through the upper opening of the upstream side passage 2a. Also, the downstream side passage 2b includes a right opening that is directed to the right and a lower opening that is directed downward. The right opening of the downstream side passage 2b is connected to the left opening of the upstream side passage 2a via the exhaust pipe 71. Also, the lower opening of the downstream side passage 2b is connected to a passage 83 inside the oil pan 11. The passage 83 inside the oil pan 11 is connected to the muffler 17. The main exhaust passage 13 includes the upstream side passage 2a, the exhaust pipe 71, the downstream side passage 2b, the passage 83, the muffler 17, and an exhaust passage (not shown) inside the lower casing 5.

Also, as shown in FIG. 20, the idle exhaust passage 14 includes the idle muffler 31. The idle muffler 31 includes a left side idle muffler 81, a right side idle muffler 82, and a partition plate 83. Each of the left side idle muffler 81 and the right side idle muffler 82 is an example of a muffler according to the fourth preferred embodiment of the present invention. The left side idle muffler 81 and the right side idle muffler 82 are, for example, respectively integral with the left side catalyst housing 76 and the right side catalyst housing 77. Large portions of the left side idle muffler 81 and the right side idle muffler 82 are disposed below the left side catalyst housing 76 and the right side catalyst housing 77. Also, the partition plate 83 is, for example, integral with the fixing flange 72c. The partition plate 33 is sandwiched by the left side idle muffler 81 and the right side idle muffler 82. The partition plate 33 partitions the left side idle muffler 81 and the right side idle muffler 82.

Figure 21A:
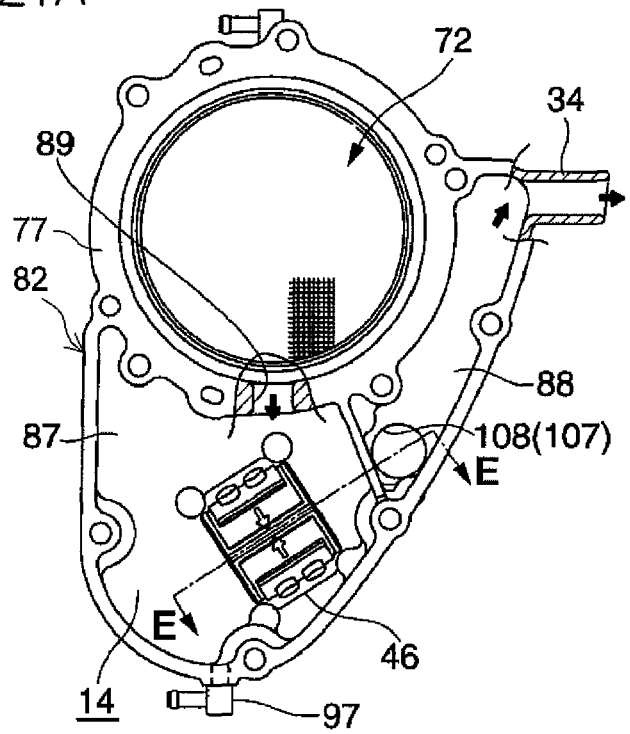
FIG. 21A is a side view of a right side idle muffler according to the fourth preferred embodiment of the present invention as viewed from a direction indicated by an arrow L1 in FIG. 16.
Figure 21B:
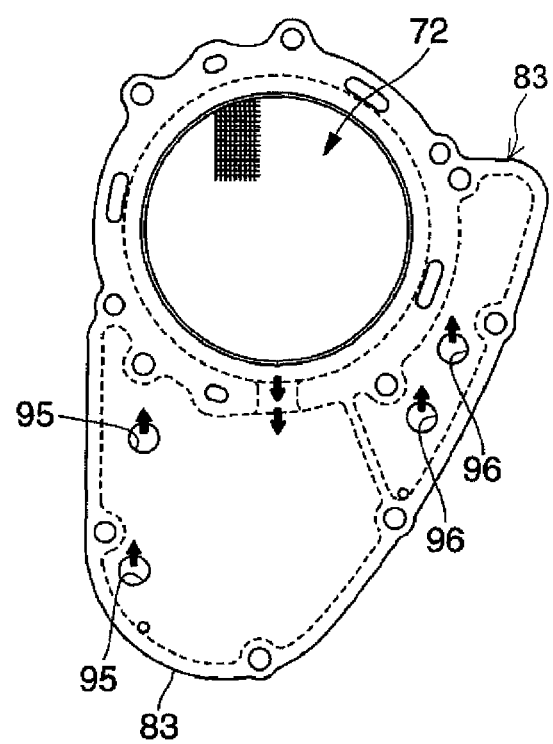
FIG. 21B is a side view of a catalyst and a partition plate according to the fourth preferred embodiment of the present invention as viewed from a direction indicated by an arrow L2 in FIG. 16.
Figure 21C:
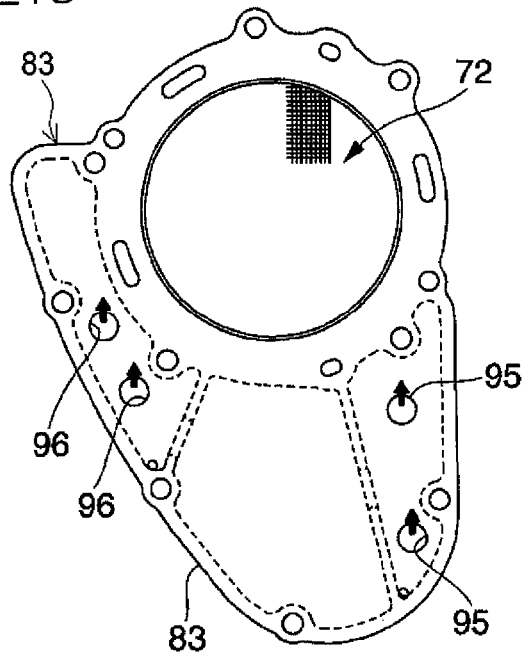
FIG. 21C is a side view of the catalyst and the partition plate according to the fourth preferred embodiment of the present invention as viewed from a direction indicated by an arrow R1 in FIG. 16.
Figure 21D:
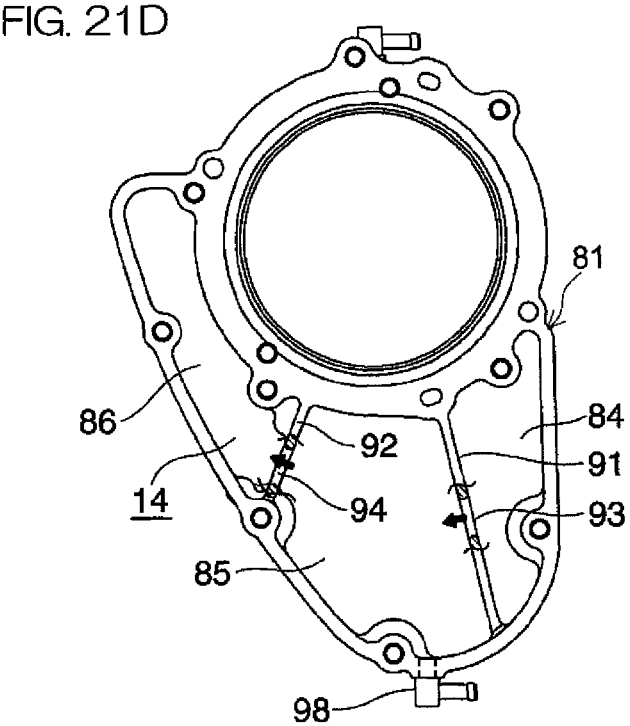
FIG. 21D is a side view of a left muffler according to the fourth preferred embodiment of the present invention as viewed from a direction indicated by an arrow R2 in FIG. 16.

As shown in FIG. 21D, the left side idle muffler 81 includes first to third expansion chambers 84 to 86, a bulkhead 91 partitioning the first expansion chamber 84 and the second expansion chamber 85, and a bulkhead 92 partitioning the second expansion chamber 85 and the third expansion chamber 86. The first expansion chamber 84 is connected to the second expansion chamber 85 by a through hole 93 that penetrates through the bulkhead 91. Also, the second expansion chamber 85 is connected to the third expansion chamber 86 by a through hole 94 that penetrates through the bulkhead 92. The second expansion chamber 85 is connected to a hose joint 98 attached to a lower end portion of the left side idle muffler 81.

Also, as shown in FIG. 21A, the right side idle muffler 82 includes an entrance side expansion chamber 87 and an exit side expansion chamber 88 that are partitioned in an interior of the right side idle muffler 82. The entrance side expansion chamber 87 is connected to a through hole 89 provided in the right side catalyst housing 77, and a hose joint 97 attached to a lower end portion of the right side idle muffler 82. Also, the exit side expansion chamber 88 is connected to the atmosphere via the discharge pipe 34. The discharge pipe 34 and the right side idle muffler 82 are, for example, integral with each other.

The partition plate 33 is sandwiched by the left side idle muffler 81 and the right side idle muffler 82 so that the first to third expansion chambers 84 to 86, the entrance side expansion chamber 87, and the exit side expansion chamber 88 are respectively independent. The entrance side expansion chamber 87 is connected to the first expansion chamber 84 by a plurality of through holes 95 (see FIGS. 21B and 21C) provided in the partition plate 83. Also, the exit side expansion chamber 88 is connected to the third expansion chamber 86 by a plurality of through holes 96 (see FIGS. 21B and 21C) provided in the partition plate 83.

Also, as shown in FIG. 20, the exhaust pipe 71 includes an exhaust passage 90 positioned at a downstream side relative to the catalyst 72, and an exhaust passage 99 positioned at an upstream side relative to the catalyst 72. The exhaust passage 90 is connected to the through hole 89 provided in the right side catalyst housing 77. The exhaust passage 90 is connected to the entrance side expansion chamber 87 via the through hole 89. The through hole 89 is an entrance of the idle exhaust passage 14. The through hole 89 is provided at a lowest portion of the right side catalyst housing 77.

Also, as shown in FIG. 20, the left side catalyst housing 76 includes a drain passage 100. The drain passage 100 is connected to the exhaust passage 99. Also, the drain passage 100 is connected to a float type drain valve 101. The drain valve 101 includes a water chamber 102, in which water is stored, and a float 103 provided in the water chamber 102. When water flows into the drain passage 100 from the exhaust passage 99 and the water accumulates in the water chamber 102, the float 103 floats and the drain valve 101 opens. The water inside the water chamber 102 is thereby discharged from the drain valve 101. Meanwhile, in a state in which water is not accumulated in the water chamber 102, the drain valve 101 is closed by the exhaust pressure. The flow of the exhaust gas that moves into the drain passage 100 from the exhaust passage 99 is thus blocked by the drain valve 101. The exhaust gas that is not cleaned by the catalyst 72 is thereby prevented from flowing.

An exhaust gas that is generated in accompaniment with combustion of gasoline or other fuel containing hydrogen atoms contains water. When such an exhaust gas is cooled, condensation may occur and water (condensed water) may form. The exhaust gas flowing inside the exhaust pipe 71 may thus undergo dew condensation by contacting an inner surface of the exhaust pipe 71 and water may form in the exhaust passage 90 and the exhaust passage 99. Also, the exhaust gas may be cooled inside the left side idle muffler 81 and water may form inside the left side idle muffler 81.

As can be understood from FIG. 20, the water that forms inside the exhaust passage 90 passes through the annular gap G2 and the through hole 89 and flows down into the right side idle muffler 82. This water is then discharged from the hose joint 97 attached to the lower end portion of the right side idle muffler 82 (see FIG. 21A). Also, as can be understood from FIG. 20, the water that forms inside the exhaust passage 99 is discharged through the drain passage 100 provided in the left side catalyst housing 76. Also, the water that forms inside the left side idle muffler 81 is discharged from the hose joint 98 attached to the lower end portion of the left side idle muffler 81 (see FIG. 21D).

When the engine 3 is idled or the hull H1 is propelled at a low speed, a large portion of the exhaust gas discharged from the engine 3 is discharged out of the outboard motor 1 through the idle exhaust passage 14. Specifically, as indicated by solid arrows in FIG. 20, the exhaust gas flows from the exhaust passage 90, through the through hole 89, and into the entrance side expansion chamber 87. The exhaust gas that flows into the entrance side expansion chamber 87 passes through the plurality of through holes 95 (see FIG. 21B and FIG. 21C) provided in the partition plate 83 and thereby flows from the entrance side expansion chamber 87 into the first expansion chamber 84 (see FIG. 21D). Then, as indicated by solid arrows in FIG. 21D, the exhaust gas passes successively through the through hole 93, the second expansion chamber 85, and the through hole 94 and thereby flows from the first expansion chamber 84 into the third expansion chamber 86. The exhaust gas that flows into the third expansion chamber 86 passes through the plurality of through holes 96 (see FIG. 21B and FIG. 21C) provided in the partition plate 83 and thereby flows from the third expansion chamber 86 into the exit side expansion chamber 88 (see FIG. 21A). Then, as indicated by solid arrows in FIG. 21A, the exhaust gas is discharged into the atmosphere through the discharge pipe 34. In the process up to the discharge into the atmosphere, the exhaust gas flowing through the idle exhaust passage 14 is expanded and contracted. The exhaust noise emitted from the discharge pipe 34 is thereby reduced. Each of the through holes 93 to 96 is an example of a contraction portion according to the fourth preferred embodiment of the present invention.

Also, as shown in FIG. 22, the entrance side expansion chamber 87 and the exit side expansion chamber 88 that are provided in the right side idle muffler 82 are connected via the bypass passage 41. The bypass passage 41 includes the lead valve 43. The lead valve 43 is attached to the right side idle muffler 82. The lead valve 43 includes the lead valve main body 46 and a housing 104. The lead valve main body 46 is inserted into the entrance side expansion chamber 87 from the outer side. A large portion of the lead valve main body 46 is disposed inside the idle exhaust passage 14. The lead valve main body 46 is covered from the outer side by the housing 104. The housing 104 is fixed to the right side idle muffler 31.

Also, as shown in FIG. 22, the lead valve main body 46 includes a flange 106. The flange 106 is disposed at an outer side of the right side idle muffler 31. The flange 106 coacts with the housing 104 to define an air passage 105. The air passage 105 is connected to the exit side expansion chamber 88 by a through hole 107 provided in the flange 106 and a through hole 108 provided in the right side idle muffler 82. The exit side expansion chamber 88 and the entrance side expansion chamber 87 of the idle exhaust passage 14 are thereby connected by the bypass passage 41.

When the pressure inside the main exhaust passage 13 is negative, air is sucked into the exit side expansion chamber 88 from the discharge pipe 34. Then, as shown by open arrows in FIG. 22, the air sucked into the exit side expansion chamber 88 passes successively through the through hole 107, the through hole 108, the air passage 105, and the lead valve main body 46, and flows into the entrance side expansion chamber 87. Air is thereby supplied into the main exhaust passage 13, and the negative pressure inside the main exhaust passage 13 is eliminated. Thus, effects and advantages equivalent to those of the outboard motors according to the first to third preferred embodiments of the present invention are provided by the outboard motor according to the fourth preferred embodiment of the present invention as well.

Examples of technical effects and merits of the outboard motor according to the fourth preferred embodiment of the present invention shall now be described.

In the fourth preferred embodiment of the present invention, the catalyst 72 is provided in the main exhaust passage 13. Also, in the fourth preferred embodiment of the present invention, even when the engine 3 is reversed, the negative pressure in the main exhaust passage 13 is eliminated. Water that enters the downstream end of the main exhaust passage 13 is thus prevented from rising caused by negative pressure. The catalyst 72 is thereby prevented from getting wet. Lowering of the cleaning ability of the catalyst 72 is thus prevented. Also, by the water inside the main exhaust passage 13 being prevented from rising, the upstream side sensor S401 and the downstream side sensor S402 disposed in the vicinity of the catalyst 72 are prevented from getting wet. A lowering in the detection accuracy of the upstream side sensor S401 and the downstream side sensor S402 is thereby prevented.

Also, in the fourth preferred embodiment of the present invention, the upstream end of the idle exhaust passage 14 is connected to the main exhaust passage 13 at the downstream side relative to the catalyst 72. Thus, when the pressure inside the main exhaust passage 13 is negative, the air that flows through the bypass passage 41 and into the upstream end of the idle exhaust passage 14 is supplied into the main exhaust passage 13 at the downstream side relative to the catalyst 72. The negative pressure at the downstream side of the catalyst 72 is thus eliminated immediately. The water that enters the downstream end of the main exhaust passage 13 is thereby reliably prevented from rising and reaching a vicinity of the catalyst 72 caused by negative pressure.

Fifth Preferred Embodiment

An outboard motor according to a fifth preferred embodiment of the present invention shall now be described with reference to FIG. 23 to FIG. 27. In FIG. 23 to FIG. 27, component portions equivalent to respective portions shown in FIG. 1 to FIG. 22 are provided with the same reference symbols as in FIG. 1 to FIG. 7C and description thereof shall be omitted where appropriate.

As shown in FIG. 23, the exhaust guide 2 includes a through hole 111 that penetrates through a rear portion of the exhaust guide 2 in a right/left direction. The left side catalyst housing 76 and the right side catalyst housing 77 that house the catalyst 72 are disposed inside the through hole 111. The left side catalyst housing 76 and the right side catalyst housing 77 are inserted into the through hole 111 from sides. The left side catalyst housing 76 and the right side catalyst housing 77 are, for example, respectively integral with the left side exhaust pipe 73 and the right side exhaust pipe 74. The left side catalyst housing 77 and the right side catalyst housing 77 sandwich the fixing flange 72c, provided on the catalyst 72, from the right and left, respectively. Also, in a vicinity of the fixing flange 72c, two seal members 112 seal a space between the left side catalyst housing 76 and an inner surface of the through hole 111 and a space between the right side catalyst housing 77 and the inner surface of the through hole 111. Leakage of exhaust gas and water is thereby prevented.

Also, as shown in FIG. 23, the left side exhaust pipe 73 includes a flange 113 provided at a rear portion of the left side exhaust pipe 73. Likewise, the right side exhaust pipe 74 includes a flange 114 provided at a rear portion of the right side exhaust pipe 74. Left side and right side openings of the through hole 111 are respectively covered by the flange 113 and the flange 114. Also, spaces surrounded by the inner surface of the through hole 111 and the flange 113 and the flange 114 are filled with cooling water. These spaces are connected to a cooling water passage 115 provided in the left side exhaust pipe 73 and a cooling water passage 116 provided in the right side exhaust pipe 74.

Figure 25:
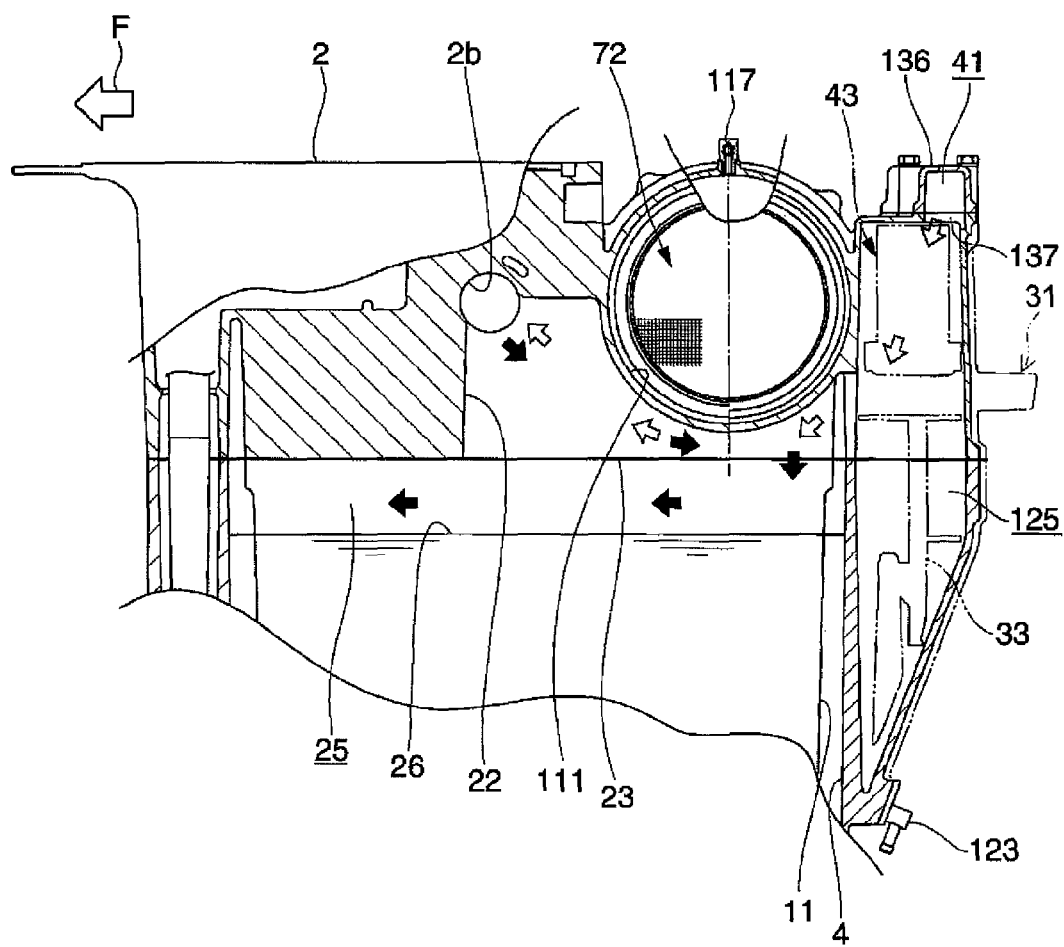
FIG. 25 is a sectional view taken along line F1-F1 in FIG. 24.

Also, as shown in FIG. 23, the cooling water passage 115 and the cooling water passage 116 are respectively connected to the cooling water passage 79 and the cooling water passage 80 provided in the exhaust guide 2. Also, the left side exhaust pipe 73 and the inner surface of the through hole 111 define a cooling water passage 115a. Also, the right side exhaust pipe 74 and the inner surface of the through hole 111 define a cooling water passage 116a. The cooling water passage 116a is connected to the cooling water passage 115a by a pipe 117 attached to the exhaust guide 2. As shown in FIG. 25, the pipe 117 is attached to an upper portion of the exhaust guide 2.

Water (condensed water) that forms in the left side exhaust pipe 73 and water (condensed water) that forms in the right side exhaust pipe 74 are respectively discharged through a first drain passage 121 and a second drain passage 122 (see FIG. 23). Specifically, as shown in FIG. 23, the first drain passage 121 is connected to the lower end portion of the left side catalyst housing 76. The first drain passage 121 includes a groove and a hole disposed in a vicinity of a coupling portion of the exhaust guide 2 and the oil pan 11. The float type drain valve 101 is attached to the left side exhaust pipe 73. Also, as shown in FIG. 25, a drain nipple 123 is connected to the lower end portion of the idle muffler 31. The drain valve 101, the idle muffler 31, and the drain nipple 123 are connected to the first drain passage 121. Water that forms inside the left side exhaust pipe 73 flows down into the first drain passage 121 from the exhaust passage 99 positioned at the upstream side relative to the catalyst 72 (see FIG. 23). This water is then discharged through the drain valve 101, the idle muffler 31, and the drain nipple 123.

Also, as shown in FIG. 23, the second drain passage 122 is connected to the lower end portion of the right side catalyst housing 77. The second drain passage 122 includes a groove and a hole disposed in a vicinity of the coupling portion of the exhaust guide 2 and the oil pan 11. The downstream side passage 2*b* provided in the exhaust guide 2 is connected to the second drain passage 122. Water that forms inside the right side exhaust pipe 74 flows down into the second drain passage 122 from the exhaust passage 90 positioned at the downstream side relative to the catalyst 72. This water is then discharged into the downstream side passage 2*b*.

Figure 24:
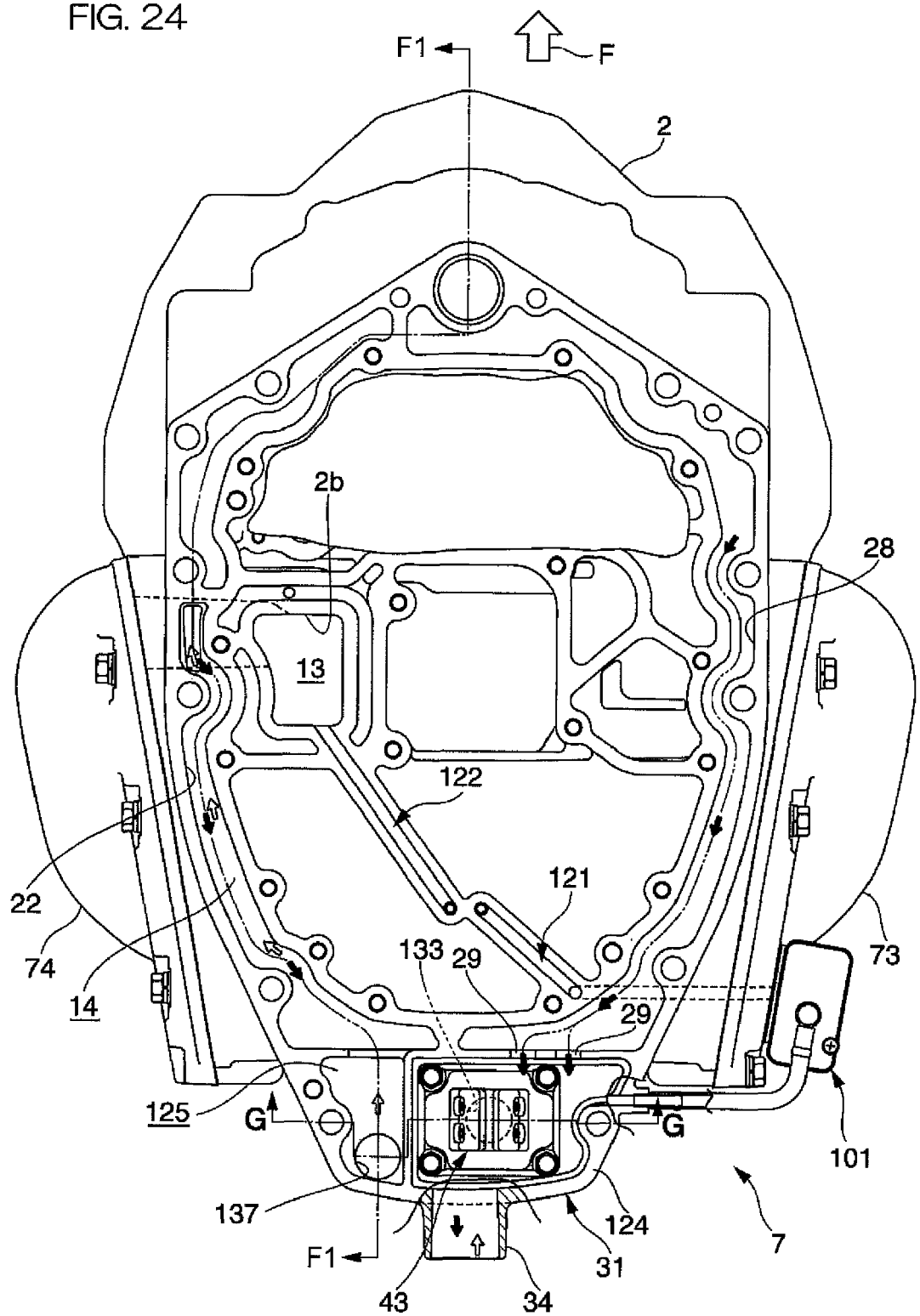
FIG. 24 is a bottom view of the exhaust guide according to the fifth preferred embodiment of the present invention.

Also, as shown in FIG. 24, the exhaust guide 2 includes the first groove 22, the second groove 23, an upper portion 124 of the idle muffler 31, and the discharge pipe 34 that are provided at lower portions of the exhaust guide 2. The first groove 22 and the second groove 28 define a portion of the idle exhaust passage 14. The first groove 22 and the second groove 28 respectively open downward. The openings of the first groove 22 and the second groove 28 are covered by the gasket 23 provided between the exhaust guide 2 and the upper casing 4 and the oil pan 11 (see FIG. 25).

Figure 26:
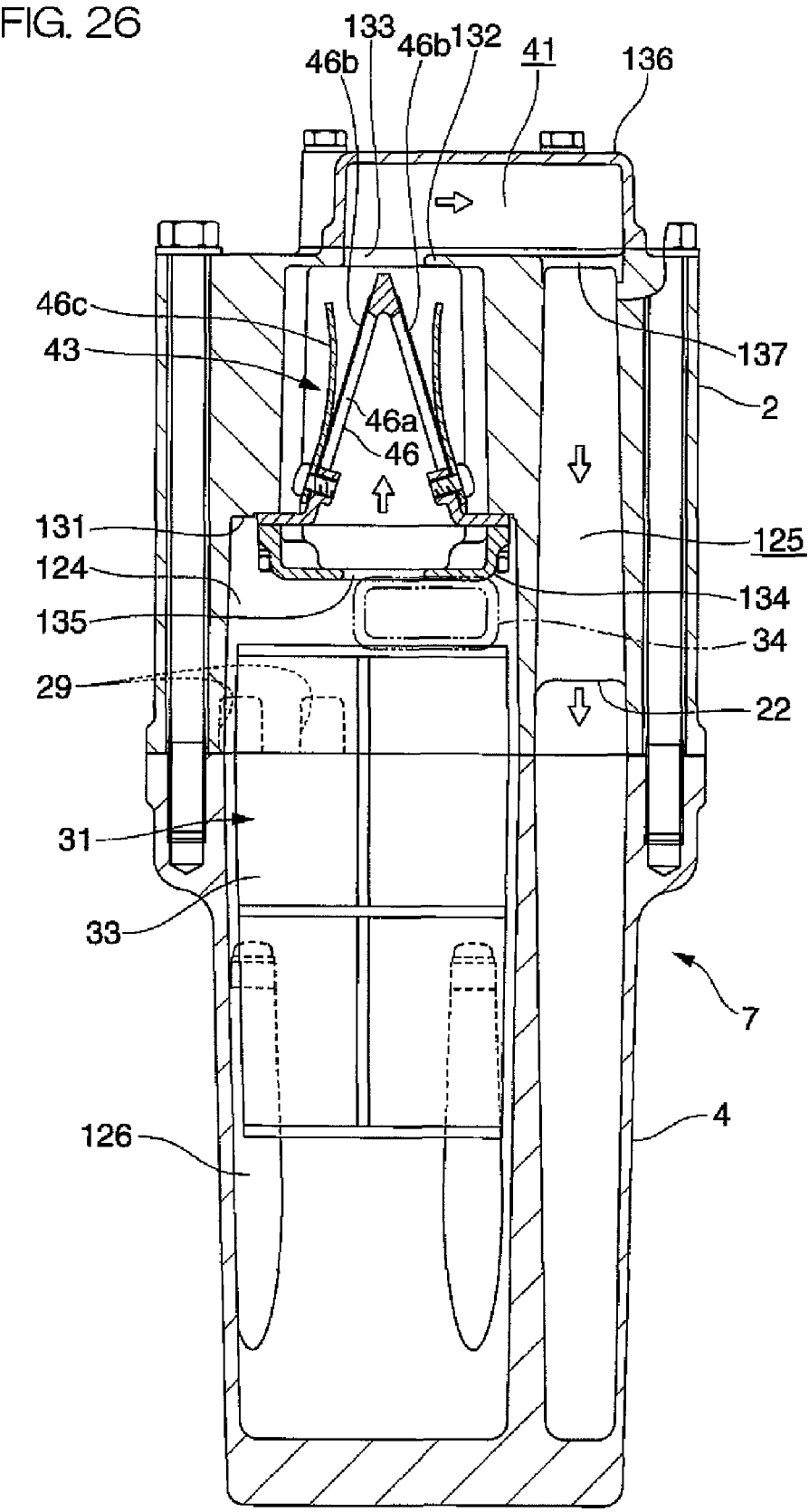
FIG. 26 is a sectional view taken along line G-G in FIG. 24.
Figure 27A:
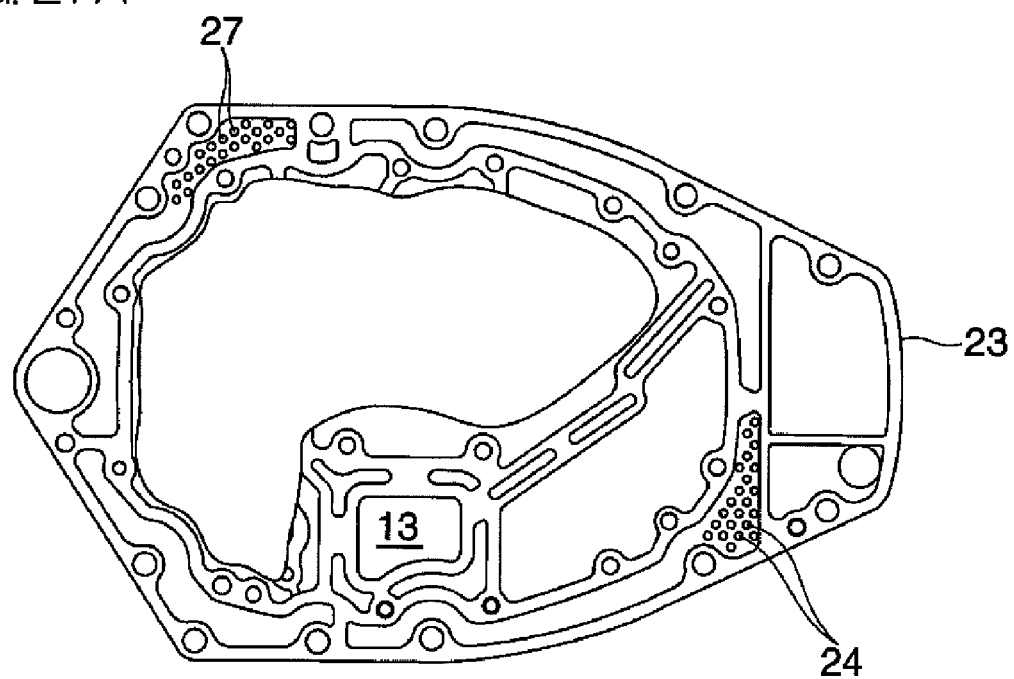
FIG. 27A is a bottom view of a gasket according to the fifth preferred embodiment of the present invention.
Figure 27B:
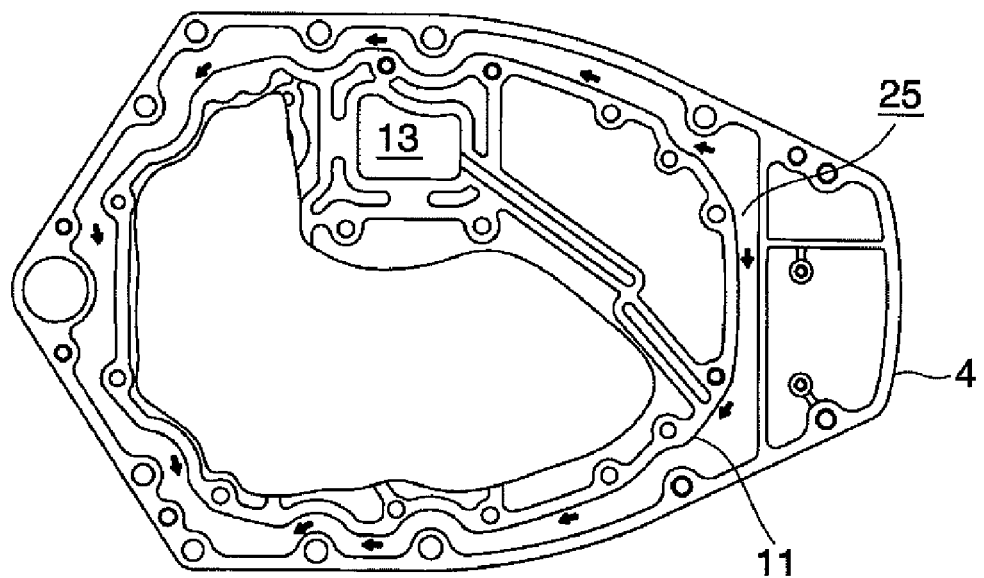
FIG. 27B is a plan view of an upper casing and an oil pan according to the fifth preferred embodiment of the present invention.

As shown in FIG. 24, the first groove 22 extends to the front and rear along a right side portion (left side portion in FIG. 24) of the exhaust guide 2. As shown in FIG. 25, the front end portion (left end portion in FIG. 25) of the first groove 22 is connected to the downstream side passage 2*b* provided in the exhaust guide 2. Also, the rear end portion of the first groove 22 is connected via the respective rear side through holes 24 of the gasket 23 (see FIG. 27A) to the air chamber 25 (see FIG. 27B) positioned below the first groove 22. Further, as shown in FIG. 24, the rear end portion of the first groove 22 is connected to a rear side air chamber 125. As shown in FIG. 26, the rear side air chamber 125 is arranged to extend vertically by a rear portion of the exhaust guide 2 and a rear portion of the upper casing 4.

Meanwhile, as shown in FIG. 24, the second groove 28 extends to the front and rear along a front portion and a left side portion (right side portion in FIG. 24) of the exhaust guide 2. The front end portion of the second groove 28 is connected via the respective front side through holes 27 of the gasket 23 (see FIG. 27A) to the air chamber 25 (see FIG. 27B). Also, as shown in FIG. 24, the rear end portion of the second groove 28 is connected to the interior of the idle muffler 31 via the plurality of slits 29. The interior of the idle muffler 31 is connected to the atmosphere via the discharge pipe 34.

As shown in FIG. 26, the idle muffler 31 includes an upper portion 124, a lower portion 126, and the partition plate 33.

The upper portion 124 is formed, for example, by the rear portion of the exhaust guide 2. Also, the lower portion 126 is formed by the rear portion of the upper casing 4. As can be understood from referencing FIG. 25 and FIG. 26 together, the partition plate 33 partitions the interior of the upper portion 124 and the interior of the lower portion 126.

Also, as shown in FIG. 26, the bypass passage 41 is provided at the upper end portion of the idle muffler 31. The upper end portion of the idle muffler 31 is connected to an upper end portion of the rear side air chamber 125 by the bypass passage 41. The idle muffler 31 includes an attachment seat 131, on which the lead valve 43 is attached, and a through hole 133 that penetrates through an upper wall 132 of the idle muffler 31 in the vertical direction.

Also, as shown in FIG. 26, the lead valve 43 includes the lead valve main body 46 including the valve element 46*b*, and a housing 134 that is attached to the attachment seat 131 along with the lead valve main body 46. The lead valve 43 vertically partitions an interior of the upper portion 124 of the idle muffler 31. The housing 134 has a through hole 135 through which the air supplied into the lead valve 43 passes. The lead valve 43 is arranged such that air flows only upward from below, that is, only to the through hole 133 side.

As shown in FIG. 26, the interior of the lead valve 43 is connected to an interior of a duct 136 via the through hole 133. The duct 136 is disposed above the idle muffler 31. The duct 136 is attached to the upper wall 132 of the idle muffler 31. The duct 136 covers the through hole 133 and a through hole 137, provided at the upper end portion of the rear side air chamber 125, from above. The upper end portion of the idle muffler 31 is thereby connected to the upper end portion of the rear side air chamber 125.

When the engine 3 is idled or the hull H1 is propelled at a low speed, a large portion of the exhaust gas discharged from the engine 3 is discharged out of the outboard motor 1 through the idle exhaust passage 14. Specifically, as can be understood from FIG. 23, after passing through the catalyst 72 and being cleaned, the exhaust gas flows through the right side exhaust tube 74 and into the downstream side passage 2*b* of the exhaust guide 2. The exhaust gas then passes through the respective rear side through holes 24 of the gasket 23 (see FIG. 27A) and flows into the air chamber 25 (see FIG. 27B). The exhaust gas then passes through the respective front side through holes 27 of the gasket 23 (see FIG. 27A) and flows into the second groove 28 (see FIG. 24). Then, as indicated by solid arrows in FIG. 24, the exhaust gas that flows into the second groove 28 flows successively through the respective slits 29, the idle muffler 31, and the discharge pipe 34 and is discharged into the atmosphere.

Meanwhile, when the pressure inside the main exhaust passage 13 is negative, air is sucked in from the discharge pipe 34 and into upper portion 124 of the idle muffler 31. Then, as indicated by open arrows in FIG. 26, the air that is sucked into the upper portion 124 of the idle muffler 31 passes successively through the lead valve 43, the through hole 133, the duct 136, the through hole 137, and the rear side air chamber 125 and flows into the first groove 22. Then, as indicated by open arrows in FIG. 25, the exhaust gas that flows into first groove 22 flows into the downstream side passage 2*b*. That is, the air is sucked into the main exhaust passage 13 without passing through the idle muffler 31 and the noise-muffling contraction portions provided in the idle exhaust passage 14. The negative pressure inside the main exhaust passage 13 is thereby eliminated. Thus, effects and advantages equivalent to those of the outboard motors according to the first to fourth preferred embodiments of the present invention are provided by the outboard motor according to the fifth preferred embodiment of the present invention as well.

Examples of technical effects and merits of the outboard motor according to the fifth preferred embodiment of the present invention shall now be described.

In the fifth preferred embodiment of the present invention, when the pressure inside the main exhaust passage 13 is negative, the air that is sucked into the bypass passage 41 is supplied to the main exhaust passage 13 from the downstream side relative to the catalyst 72. The negative pressure at the downstream side of the catalyst 72 is thus eliminated immediately. The water that enters the downstream end of the main exhaust passage 13 is thereby reliably prevented from rising and reaching a vicinity of the catalyst 72 caused by negative pressure.

The present application corresponds to Japanese Patent Application No. 2009-095887 filed in the Japan Patent Office on Apr. 10, 2009, and whole disclosure of this application is incorporated herein by reference.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An outboard motor comprising:
   an engine including an exhaust port;
   an exhaust passage including a first upstream end connected to the exhaust port of the engine, and a first downstream end arranged to open underwater;
   an idle exhaust passage including a second upstream end connected to the exhaust passage, and a second downstream end arranged to open to atmosphere;
   a contraction portion and an expansion chamber provided in the idle exhaust passage and arranged to reduce exhaust noise;
   a bypass passage including a third upstream end connected to the idle exhaust passage at a downstream side relative to the contraction portion and the expansion chamber, and a third downstream end connected to the idle exhaust passage at an upstream side relative to the contraction portion and the expansion chamber; and
   a check valve provided in the bypass passage and arranged such that air flows only from the third upstream end to the third downstream end.

2. The outboard motor according to claim 1, further comprising a catalyst provided in the exhaust passage.

3. The outboard motor according to claim 2, wherein the second upstream end of the idle exhaust passage is connected to the exhaust passage at a downstream side relative to the catalyst.

4. The outboard motor according to claim 1, wherein the check valve includes a lead valve arranged to open and close automatically according to a pressure inside the exhaust passage.

5. The outboard motor according to claim 1, further comprising:
   an exhaust guide supporting the engine; and
   an upper casing and an oil pan attached to a lower portion of the exhaust guide; wherein
   a portion of the idle exhaust passage is defined by the exhaust guide, the upper casing, and the oil pan; and
   the check valve is attached on the exhaust guide and includes a housing defining a portion of the bypass passage.

6. The outboard motor according to claim 1, further comprising a pipe defining a portion of the bypass passage.

7. The outboard motor according to claim 1, further comprising an upstream side contraction portion provided in the idle exhaust passage at an upstream side relative to the contraction portion and the expansion chamber, wherein the third downstream end of the bypass passage is connected to the idle exhaust passage at a downstream side relative to the upstream side contraction portion.

8. The outboard motor according to claim 1, further comprising:
   an exhaust pipe defining a portion of the exhaust passage; and
   a muffler that is integral with the exhaust pipe and defines a portion of the idle exhaust passage; wherein
   a portion of the check valve is housed inside the muffler.

* * * * *